(12) United States Patent
Komatsu et al.

(10) Patent No.: US 8,236,371 B2
(45) Date of Patent: *Aug. 7, 2012

(54) METHOD OF MANUFACTURING ELECTROPHORETIC DISPLAY DEVICE, ELECTROPHORETIC DISPLAY DEVICE AND ELECTRONIC DEVICE

(75) Inventors: Harunobu Komatsu, Matsumoto (JP); Hitoshi Yamamoto, Chino (JP); Akira Matsumoto, Chino (JP); Mitsuo Kushino, Kawabe-gun (JP); Tomoyuki Kuwamoto, Nara (JP); Teruki Matsushita, Suita (JP)

(73) Assignees: Seiko Epson Corporation, Tokyo (JP); Nippon Shokubai Co., Ltd., Osaka-shi (JP)

( * ) Notice: Subject to any disclaimer, the term of this patent is extended or adjusted under 35 U.S.C. 154(b) by 699 days.

This patent is subject to a terminal disclaimer.

(21) Appl. No.: 12/379,305

(22) Filed: Feb. 18, 2009

(65) Prior Publication Data

US 2009/0208730 A1 Aug. 20, 2009

(30) Foreign Application Priority Data

Feb. 20, 2008 (JP) ................................. 2008-039184

(51) Int. Cl.
*B05D 5/06* (2006.01)
*B05D 3/00* (2006.01)
*B05D 3/12* (2006.01)

(52) U.S. Cl. .......... 427/58; 427/202; 427/203; 427/270; 427/271; 427/346

(58) Field of Classification Search .................... 427/58, 427/202–203, 346, 270–271
See application file for complete search history.

(56) References Cited

U.S. PATENT DOCUMENTS

| 7,193,770 | B2 | 3/2007 | Kanbe | |
|---|---|---|---|---|
| 7,307,780 | B2 | 12/2007 | Kanbe | |
| 2002/0185378 | A1* | 12/2002 | Honeyman et al. | 204/601 |
| 2003/0103258 | A1* | 6/2003 | Kawai | 359/296 |
| 2004/0182711 | A1* | 9/2004 | Liang et al. | 204/606 |
| 2007/0121194 | A1* | 5/2007 | Kanbe | 359/296 |

FOREIGN PATENT DOCUMENTS

JP 2000-066247 * 3/2000

(Continued)

*Primary Examiner* — James Lin
(74) *Attorney, Agent, or Firm* — Oliff & Berridge, PLC

(57) ABSTRACT

A method of manufacturing an electrophoretic display device is provided. The method comprises: preparing a plate-shaped first electrode provided on a first base portion, and the first electrode having a surface; preparing plate-shaped second electrodes provided on a second base portion; forming a first binder layer on the surface of the first electrode; supplying a plurality of microcapsules on the first binder layer, the plurality of microcapsules each having an internal space, the internal space filled with an electrophoretic dispersion liquid, the electrophoretic dispersion liquid containing electrophoretic particles having different colors, and the plurality of microcapsules including properly-sized microcapsules and improperly-sized microcapsules; fixing the properly-sized microcapsules to the surface of the first electrode through the first binder layer to obtain an electrophoretic display sheet; removing the improperly-sized microcapsules which are not brought into contact with the first binder layer from the electrophoretic display sheet; forming a second binder layer on the first binder layer so as to cover the properly-sized microcapsules; and providing the second electrodes on the second binder layer to obtain the electrophoretic display device. The method is capable of efficiently manufacturing the electrophoretic display device having high display performance by arranging microcapsules on electrodes so that the microcapsules are not overlapped with each other. Further, an electrophoretic display device and an electronic device are also provided.

15 Claims, 10 Drawing Sheets

FOREIGN PATENT DOCUMENTS

| | | |
|---|---|---|
| JP | A-2003-322879 | 11/2003 |
| JP | A-2004-157237 | 6/2004 |
| JP | A-2006-030471 | 2/2006 |
| JP | A-2006-106452 | 4/2006 |
| JP | A-2006-259706 | 9/2006 |
| JP | A-2007-058151 | 3/2007 |
| JP | A-2007-133109 | 5/2007 |
| JP | A-2007-219185 | 8/2007 |

\* cited by examiner

FIG. 5F
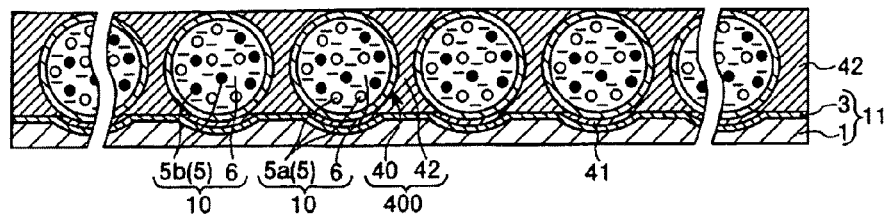
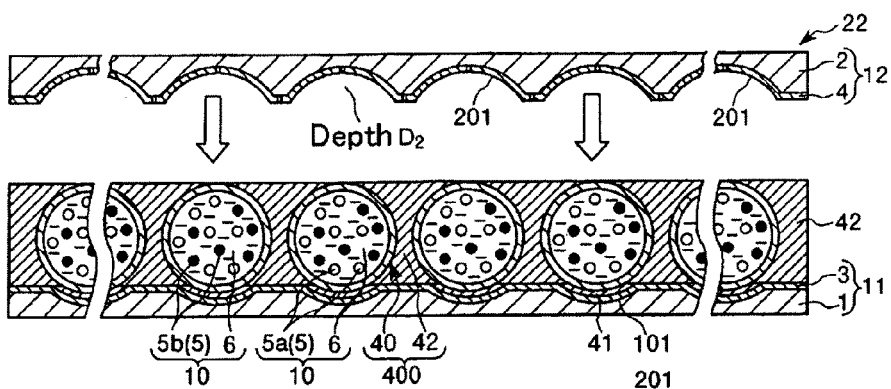
FIG. 5G
FIG. 5H
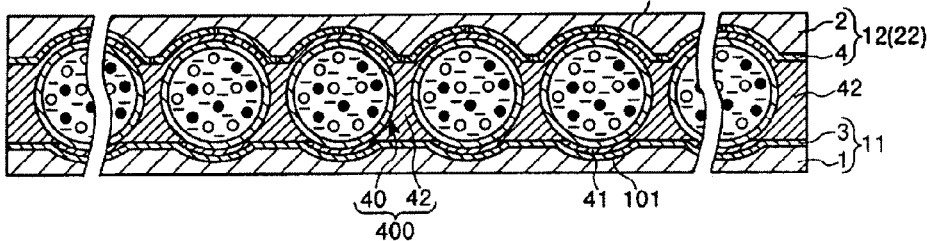
FIG. 5I
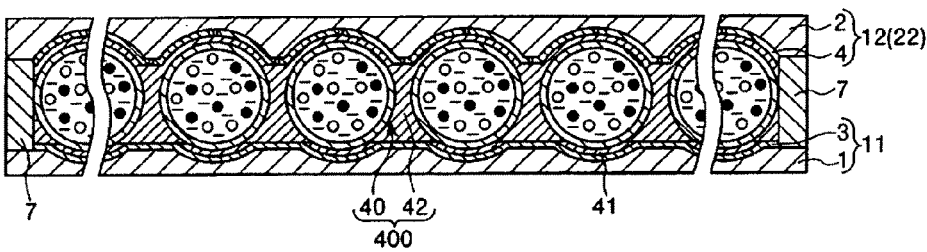

METHOD OF MANUFACTURING ELECTROPHORETIC DISPLAY DEVICE, ELECTROPHORETIC DISPLAY DEVICE AND ELECTRONIC DEVICE

CROSS-REFERENCE TO RELATED APPLICATION

This application claims a priority to Japanese Patent Application No. 2008-039184 filed on Feb. 20, 2008 which is hereby expressly incorporated by reference herein in its entirety.

BACKGROUND

1. Technical Field

The present invention relates to a method of manufacturing an electrophoretic display device, an electrophoretic display device and an electronic device, and more specially relates to a method of manufacturing an electrophoretic display device, the electrophoretic display device manufactured by the method, and an electronic device provided with the electrophoretic display device.

2. Related Art

It is generally known that, if electric fields are allowed to act on a dispersion system in which fine particles are dispersed in liquid, the fine particles move (or migrate) in the liquid by the Coulomb force. This phenomenon is referred to as electrophoresis. In recent years, an electrophoretic display device that displays desired information (images) using the electrophoresis draws attention as a new display device.

The electrophoretic display device is characterized by exhibiting display memory characteristics and broad viewing angle characteristics even at the time of stoppage of voltage application and by possessing a capability of performing high contrast display with reduced electricity consumption.

An electrophoretic display device is a non-luminous type (reflection type) display device. Therefore, the electrophoretic display device has such a characteristic that scarcely damage eyes as compared to a luminous type display device such as a cathode-ray tube display.

As such an electrophoretic display device, there is known a microcapsule-type electrophoretic display device that includes a pair of substrates each having an electrode, and a plurality of microcapsules arranged between the substrates and filled with a dispersion system in which electrophoretic particles (fine particles) are dispersed in a dispersion medium (JP A-2007-58151 is an example of the related art).

In the case where such an electrophoretic display device is manufactured, first, a plurality of microcapsules, a binder and liquid are mixed to each other to obtain a mixture, and then the mixture is applied onto the electrode of one substrate of the pair of substrates. Thereafter, the binder is solidified by removing the liquid contained in the applied mixture, thereby the plurality of microcapsules contained in the applied mixture are fixed on the electrode of the one substrate.

However, in this method of manufacturing the electrophoretic display device, a viscosity of the mixture to be supplied onto the electrode of the one substrate becomes high. Therefore, in the case where the mixture in which the plurality of microcapsules and the binder are mixed to each other is supplied onto the electrode of the one substrate, there is a case that the plurality of microcapsules overlap with or ride on each other in a thickness direction of the substrate.

If the plurality of microcapsules overlap with or ride on each other as described above, intensity of electric fields which are allowed to act on the electrophoretic particles included in the plurality of microcapsules becomes ununiform. As a result, it is known that the electrophoretic particles are moved ununiformly so that variations in display occur and contrast is lowered.

Further, when the plurality of microcapsules and the binder are mixed to each other to obtain the mixture, there is a fear that bubbles are mixed in the mixture. The mixed bubbles prevent the electric fields from acting on the plurality of microcapsules. This is a growing concern that movement of the electrophoretic particles is inhibited.

SUMMARY

It is an object of the present invention to provide a method of manufacturing an electrophoretic display device being capable of efficiently manufacturing the electrophoretic display device having high display performance by arranging microcapsules on an electrode so that the microcapsules are not overlapped with each other, that is, the microcapsules is arranged in a monolayer in a side by side relation.

Further, it is another object of the present invention to provide an electrophoretic display device manufactured by using such a method, and an electronic device provided with the electrophoretic display device having high reliability.

These objects are achieved by the present invention described below.

In a first aspect of the present invention, there is provided a method of manufacturing an electrophoretic display device.

The method comprises: preparing a plate-shaped first electrode provided on a first base portion, and the first electrode having a surface; forming a first binder layer on the surface of the first electrode; supplying a plurality of microcapsules on the first binder layer, the plurality of microcapsules each having an internal space, the internal space filled with an electrophoretic dispersion liquid, the electrophoretic dispersion liquid containing electrophoretic particles having different colors, and the plurality of microcapsules including properly-sized microcapsules and improperly-sized microcapsules; fixing the properly-sized microcapsules to the surface of the first electrode through the first binder layer to obtain an electrophoretic display sheet; removing the improperly-sized microcapsules which are not brought into contact with the first binder layer from the electrophoretic display sheet; forming a second binder layer on the first binder layer so as to cover the properly-sized microcapsules; and providing second electrodes provided on a second base portion on the second binder layer to obtain the electrophoretic display device.

According to the method described above, it is possible to efficiently manufacture an electrophoretic display device having high display performance by arranging properly-sized microcapsules on a first electrode so that the properly-sized microcapsules are not overlapped with each other, that is, the properly-sized microcapsules is arranged in a monolayer in a side by side relation.

In a second aspect of the present invention, there is provided a method of manufacturing an electrophoretic display device.

The method comprises: preparing a plate-shaped first electrode provided on a first base portion, and the first electrode having a surface; preparing plate-shaped second electrodes provided on a second base portion; forming a first binder layer on the surface of the first electrode; supplying a plurality of microcapsules on the first binder layer, the plurality of microcapsules each having an internal space, the internal space filled with an electrophoretic dispersion liquid, the electrophoretic dispersion liquid containing electrophoretic particles having different colors, and the plurality of microcapsules including properly-sized microcapsules and improperly-sized microcapsules; fixing the properly-sized microcapsules to the surface of the first electrode through the first binder layer to obtain an electrophoretic display sheet; removing the improperly-sized microcapsules which are not brought into contact with the first binder layer from the electrophoretic display sheet; forming a second binder layer preliminarily on the second electrodes provided on the second base portion; and providing the second binder layer formed on the second electrodes on the properly-sized microcapsules of the electrophoretic sheet so that the second binder layer adheres to the properly-sized microcapsules to obtain the electrophoretic display device.

According to the method described above, it is possible to efficiently manufacture an electrophoretic display device having high display performance by arranging properly-sized microcapsules on a first electrode so that the properly-sized microcapsules are not overlapped with each other, that is, the properly-sized microcapsules is arranged in a monolayer in a side by side relation.

In the method according to the present invention, it is preferred that the first electrode has a plurality of concave portions on the surface thereof, the concave portions are formed by allowing the surface of the first electrode to cave, and the first binder layer is selectively formed in the concave portions of the first electrode.

According to the method described above, the particle size of each of the properly-sized microcapsules to be fixed onto the first binder layer can be uniformed to same extent. This means that it is difficult for extremely large microcapsules and extremely small microcapsules to bring into contact with the first binder layer, that is, it becomes difficult that these microcapsules are fixed to the first binder layer. As a result, it is possible to remove the improperly-sized microcapsules of the different sizes with ease, thereby being capable of preventing variations in display from occuring in the electrophoretic display device.

In the method according to the present invention, it is also preferred that when a volume-average particle size of the properly-sized microcapsules is defined as "d", the depth of each of the concave portions provided on the surface of the first electrode is in the range of 0.1 d to 0.25 d.

According to the method described above, after relatively large microcapsules, that is, the properly-sized microcapsules enter into the concave portions provided on the first electrode, it is difficult for relatively small microcapsules, that is, the improperly-sized microcapsules to enter into the concave portions. As a result, it is possible to reliably carry out sorting of the size of the plurality of microcapsules.

In the method according to the present invention, it is also preferred that an average thickness of the first binder layer is in the range of 10 to 60% with respect to the depth of each of the concave portions provided on the surface of the first electrode.

According to the method described above, it is possible for the first binder layer to ensure sufficient bonding force. Even if a constituent material of the first binder layer is extruded out of the concave portions by the properly-sized microcapsules which have entered into the concave portions, it is possible to reliably prevent the extruded constituent material of the first binder layer from rising up and bringing into contact with the second binder layer.

In the method according to the present invention, it is also preferred that the supplying step of the plurality of microcapsules comprises: dispersing the plurality of microcapsules to a dispersion medium having a volatile property to obtain a microcapsule dispersion liquid; supplying the microcapsule dispersion liquid onto the first binder layer to obtain a liquid coating film; and volatilizing and removing the dispersion medium from the liquid coating film to thereby allow the properly-sized microcapsules to remain on the first binder layer.

This makes it possible to easily arrange only properly-sized microcapsules on the first binder layer.

In the method according to the present invention, it is also preferred that the specific gravity of the dispersion medium is lower than the specific gravity of each of the plurality of microcapsules.

This makes it possible to rapidly settle down the properly-sized microcapsules when the microcapsule dispersion liquid is supplied onto the first binder layer. Therefore, it is possible to efficiently arrange only properly-sized microcapsules on the first binder layer.

In the method according to the present invention, it is also preferred that before the removing step of the improperly-sized microcapsules and after the fixing step of the properly-sized microcapsules, wherein the method further comprising: compressing the properly-sized microcapsules in a thickness direction of the first base portion to press the properly-sized microcapsules to the first binder layer.

According to the method described above, the relatively large microcapsules (properly-sized microcapsules) are pushed preferentially, thereby enabling the relatively large microcapsules to preferentially enter into the concave portions provided on the surface of the first electrode.

As a result, the plurality of microcapsules can be sorted into properly-sized microcapsules being capable of entering into the concave portions and the improperly-sized microcapsules being incapable of entering into the concave portions by the size thereof.

In the method according to the present invention, it is also preferred that the pressure of compressing the properly-sized microcapsules is in the range of 0.01 to 0.2 MPa.

This makes it possible to reliably press the properly-sized microcapsules to the first binder layer without destruction of the properly-sized microcapsules.

In the method according to the present invention, it is also preferred that the removing step of the improperly-sized microcapsules is carried out by tilting the electrophoretic display sheet to allow the improperly-sized microcapsules to fall from the electrophoretic display sheet.

According to the method described above, the improperly-sized microcapsules that can not be fixed onto the first electrode (first binder layer) fall from the electrophoretic display sheet, thereby removing them easily from the electrophoretic display sheet.

In the method according to the present invention, it is also preferred that the removing step of the improperly-sized microcapsules is carried out by applying vibration to the electrophoretic sheet to shake the improperly-sized microcapsules from the electrophoretic display sheet.

According to the method described above, the improperly-sized microcapsules that can not be fixed onto the first electrode (first binder layer) fall from the electrophoretic display sheet, thereby removing them easily from the electrophoretic display sheet.

In the method according to the present invention, it is also preferred that in the fixing step of the properly-sized microcapsules, the properly-sized microcapsules form interspaces therebetween, wherein the second binder layer is formed on the first binder layer so as to fill the interspaces.

This makes it possible for the second binder layer to reliably insulate between the first electrode and the second electrodes.

In the method according to the present invention, it is also preferred that the second base portion has a surface on which the second electrodes are formed and a plurality of concave portions provided on the surfaces thereof, and the second electrodes formed on the surface of the second base portion and in the concave portions of the second base portion, wherein the second binder layer is formed on the first binder layer so as to be in contact with the second electrodes formed in the concave portions provided on the surface of the second base portion.

According to the method described above, the second binder layer is reliably fixed onto the second electrodes. Therefore, when the second electrodes on which the second binder layer is bonded are provided on the properly-sized microcapsules of the electrophoretic display sheet, even if the side of the second electrodes on which the second binder layer is bonded face in a vertical direction, it is possible to reliably prevent the second binder layer from dropping from the second electrodes.

In the method according to the present invention, it is also preferred that when a volume-average particle size of the properly-sized microcapsules is defined as "d", the depth of each of the concave portions provided on the surface of the second base portion is in the range of 0.12 d to 0.5 d.

According to the method described above, an effective area of each surface of the second electrodes which allows the electronic fields to act on the properly-sized microcapsules can be ensured sufficiently. Further, gaps between the first electrode and the second electrodes can be also ensured sufficiently.

As a result, the electrophoretic display device can reliably prevent the current flowing between the first electrode and the second electrodes from being leaked. For these reasons, the manufactured electrophoretic display device can exhibit superior display characteristics with reduced electricity consumption.

In the method according to the present invention, it is also preferred that a volume-average particle size of the properly-sized microcapsules is in the range of 20 to 60 μm.

According to the method described above, the properly-sized microcapsules become hard, and thus the manufactured electrophoretic display device can have improved display characteristics.

In the method according to the present invention, it is also preferred that each of the properly-sized microcapsules has in a substantially spherical shape.

According to the method described above, even if compressive force is applied to the properly-sized microcapsules, the properly-sized microcapsules have sufficient pressure resistance and bleed resistance. Therefore, the electrophoretic display device can stably operate for a long period of time.

In a third aspect of the present invention, there is provided an electrophoretic display device manufactured by the method described above.

This makes it possible to obtain an electrophoretic display device with high display characteristics.

In a fourth aspect of the present invention, there is provided an electronic device provided with the electrophoretic display device described above.

This also makes it possible to obtain an electronic device with high reliability.

In the method according to the present invention, it is also preferred that the first binder layer includes sub-first binder layers, the sub-first binder layers are formed only in the concave portions of the first electrode.

BRIEF DESCRIPTION OF THE DRAWINGS

FIGS. 5F to 5I are pattern diagrams for explaining the first embodiment of the method of manufacturing the electrophoretic display device according to the present invention.

DESCRIPTION OF EXEMPLARY EMBODIMENTS

Hereinafter, a method of manufacturing an electrophoretic display device, an electrophoretic display device and an electronic device in accordance with the present invention will be described in detail with reference to preferred embodiments shown in the accompanying drawings.

Electrophoretic Display Device

First, a description will be made on an electrophoretic display device according to the present invention.

Figure 1:
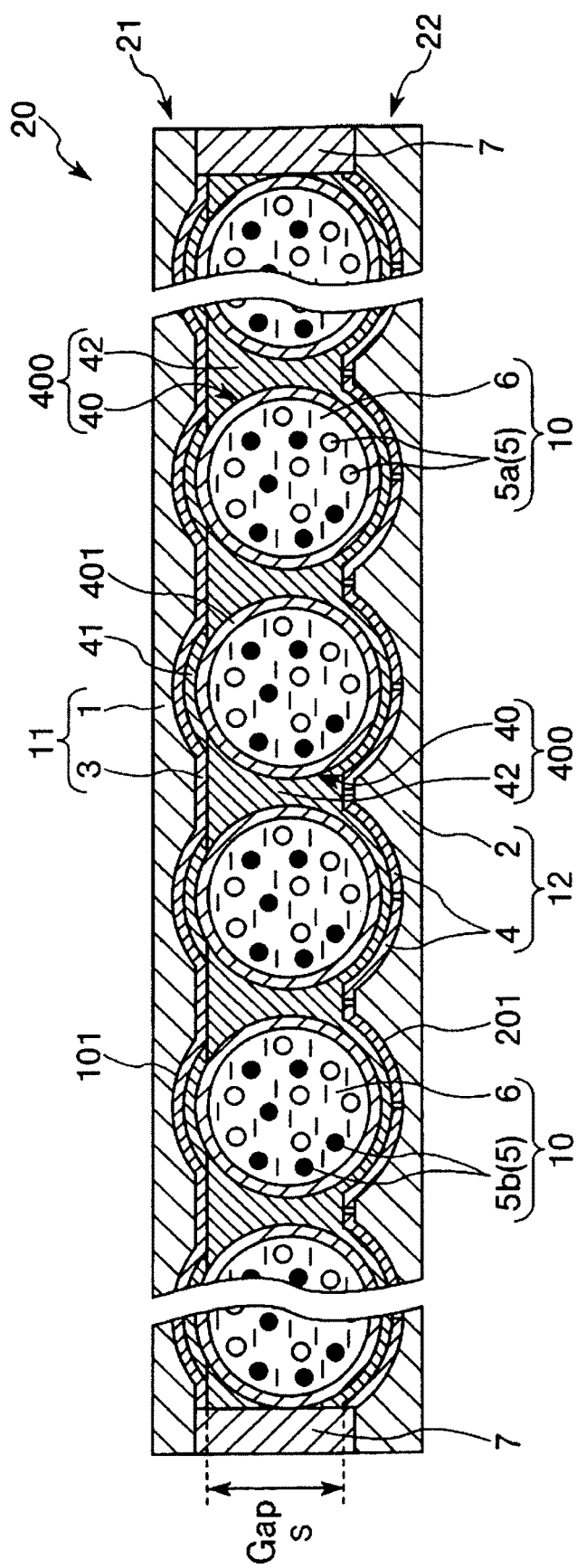
FIG. 1 is a pattern diagram showing a vertical section of an electrophoretic display device according to the present invention.

FIG. 1 is a pattern diagram showing a vertical section of the electrophoretic display device according to the present invention. Hereinafter, the upper side in FIG. 1 will be referred to as "upper" and the lower side will be referred to as "lower" for the purpose of convenience in description.

The electrophoretic display device 20 shown in FIG. 1 includes an electrophoretic display sheet (a front plane) 21, a circuit board (a back plane) 22, and a sealing part 7 for air-tightly sealing a gap between the electrophoretic display sheet 21 and the circuit board 22.

The electrophoretic display sheet 21 includes a base substrate 11, which has a base portion 1 and a first electrode 3 formed on a lower surface of the base portion 1, a plurality of microcapsules (hereinafter, simply referred to as "microcapsules") 40 arranged on a lower surface (one major surface) of the base substrate 11 (the first electrode 3), and first binder layers 41 formed between the microcapsules 40 and the first electrode 3. These microcapsules 40 include an electrophoretic dispersion liquid 10 containing electrophoretic particles 5 in an internal space thereof.

In this regard, the microcapsules 40 also include properly-sized microcapsules 40 and improperly-sized microcapsules 40. In this embodiment, the properly-sized microcapsules 40 are arranged on the lower surface of the base substrate 11. In other words, the properly-sized microcapsules 40 are fixed to the first binder layers 41. On the other hand, the improperly-sized microcapsules 40 are removed from the electrophoretic display sheet 21 when the electrophoretic display device 20 is manufactured.

Further, a plurality of concave portions (hereinafter, simply referred to as "concave portions") 101 are formed on the lower surface of the base portion 1. The first electrode 3 described above is provided on the lower surface of the base portion 1 and a surface (lower surface) of each of the concave portions 101.

On the other hand, the circuit board 22 includes an opposite substrate 12 which has a base portion 2 and a plurality of second electrodes (hereinafter, simply referred to as "second electrodes") 4 formed on an upper surface of the base portion 2, and circuits (not shown) provided in the opposite substrate 12 (the base portion 2), the circuits including switching elements such as TFTs and the like.

Further, a plurality of concave portions (hereinafter, simply referred to as "concave portions") 201 are formed on the upper surface of the base portion 2. The second electrodes 4 described above are provided on the upper surface of the base portion 2 and a surface (upper surface) of each of the concave portions 201.

Furthermore, an upper portion of each of the properly-sized microcapsules 40 enters into (are placed) the concave portions 101, respectively. On the other hand, a lower portion of each of the properly-sized microcapsules 40 enters into (are placed) the concave portions 201, respectively.

In the electrophoretic display device 20 provided with such an electrophoretic display sheet 21 and such a circuit board 22, the electrophoretic particles 5 are moved by applying a voltage between the first electrode 3 and the second electrodes 4. This makes it possible to display desired information (image) on a display portion of the upper surface of the base substrate 11.

Hereinafter, a construction of the respective parts will be now described one after another.

The base portions 1 and 2 are formed from a sheet-like (plate-like) member and have a function of supporting or protecting the respective members arranged therebetween.

Although the base portions 1 and 2 may be either flexible or rigid, it is preferred that the base portions 1 and 2 have flexibility. Use of the base portions 1 and 2 having flexibility makes it possible to provide a flexible electrophoretic display device 20, namely, an electrophoretic display device 20 useful in constructing, e.g., an electronic paper.

In the case where the base portions 1 and 2 are flexible, examples of a constituent material thereof include polyolefin such as polyethylene, modified polyolefin, polyamide, thermoplastic polyimide, polyether, polyether ether ketone, various kinds of thermoplastic elastomers such as s polyurethane-based elastomer and a chlorinated polyethylene-based elastomer, copolymers mainly constituted of the above materials, blends mainly constituted of the above materials, polymer alloys mainly constituted of the above materials, and the like. One or more of these materials may be used independently or in combination.

An average thickness of each of the base portions 1 and 2 is not particularly limited to a specific value, but may be arbitrarily set depending on the constituent material and use thereof.

In the case where the base portions 1 and 2 are flexible, the average thickness of each of the base portions 1 and 2 is preferably in the range of about 20 to 500 μm, and more preferably in the range of about 25 to 250 μm. This makes it possible to reduce the size (especially, the thickness) of the electrophoretic display device 20, while harmonizing flexibility and strength of the electrophoretic display device 20.

The first electrode 3 and the second electrodes 4 are of a layered shape (film shape) and are respectively formed on major surfaces of the base portions 1 and 2 on the sides of a microcapsule-containing layer 400. In other words, the first electrode 3 is formed on the lower surface of the base portion 1 and the second electrodes 4 are formed on the upper surface of the base portion 2.

If a voltage is applied to between the first electrode 3 and the second electrodes 4, electric fields are generated across them so that the electric fields act on electrophoretic particles (display particles) 5.

In this embodiment, the first electrode 3 serves as a common electrode and the second electrodes 4 function as individual electrodes divided in a form of a matrix (pixel electrodes connected to the switching elements). A portion where the first electrode 3 is overlapped with one of the second electrodes 4 constitutes a unit pixel.

Just like the second electrodes 4, the first electrode 3 may be divided into a plurality of electrodes. Furthermore, the first electrode 3 may be divided into a plurality of stripe-shaped electrodes and, similarly, the second electrodes 4 may be divided into a plurality of stripe-shaped electrodes. In this case, the first electrode 3 and the second electrodes 4 may be arranged to intersect with each other.

A constituent material of each of the first electrode 3 and the second electrodes 4 is not particularly limited to a specific type as long as it is substantially conductive. Various kinds of conductive materials may be used as the constituent material of each of the first electrode 3 and the second electrodes 4.

Examples of such a conductive material include: a metallic material such as copper, aluminum or alloy containing these metals; a carbon-based material such as carbon black; an electronically conductive polymer material such as polyacetylene, polyfluorene or derivatives thereof; an ion-conductive polymer material produced by dispersing an ionic substance such as NaCl or $Cu(CF_3SO_3)_2$ in a matrix resin such as polyvinyl alcohol or polycarbonate; and a conductive oxide material such as indium oxide (IO); and the like. One or more of these materials may be used independently or in combination.

An average thickness of each of the first electrode 3 and the second electrodes 4 is not particularly limited to a specific value, but may be arbitrarily set depending on the constituent material and use thereof. The average thickness of each of the first electrode 3 and the second electrodes 4 is preferably in the range of about 0.05 to 10 μm, and more preferably in the range of about 0.05 to 5 μm.

Among the base portions 1 and 2 and the first electrode 3 and the second electrodes 4, the ones arranged on a display surface side (the base portion 1 and the first electrode 3 in this embodiment) are optically transparent, i.e., substantially transparent (clear and colorless, clear and colorful, or translucent).

This makes it possible to easily recognize, through visual observation, a status of the electrophoretic particles 5 in the electrophoretic dispersion liquid 10 described below, i.e., information (images) displayed by the electrophoretic display device 20.

In the electrophoretic display sheet 21, a microcapsule-containing layer 400 is provided on the lower surface of the first electrode 3 and lower surfaces of first binder layers 41. The microcapsule-containing layer 400 includes the properly-sized microcapsules 40 each having a capsule body (shell) 401 filled with (encapsulating) the electrophoretic dispersion liquid 10, and a second binder layer 42 for fixing (or holding) the properly-sized microcapsules 40.

Examples of a constituent material of the capsule body (shell) 401 include: gelatin; a composite material consisted of gum arabic and gelatin; and various kinds of resin material such as an urethane-based resin, a melamine-based resin, an urea-formaldehyde resin, polyamide, polyether or the like. One or more of these materials may be used independently or in combination.

Examples of the gelatin include: untreated gelatin; lime-treated gelatin; oxidation-treated gelatin; decalcified gelatin with reduced calcium content; and oxidation-treated gelatin having reduced methionine residues. One or more of them may be used independently or in combination.

The constituent material of the capsule body 401 may be cross-linked (three-dimensional cross-linked) by means of a cross-linking agent. This makes it possible to increase strength of the capsule body 401 while maintaining flexibility thereof. As a result, it is possible to prevent the properly-sized microcapsules 40 from being broken with ease.

In this regard, it is to be noted that the capsule body 401 may have a monolayer structure, but a laminated structure in which a plurality of layers are formed by laminating. In this case, a constituent material of each of the layers may be an identical material or a different material each other.

The electrophoretic dispersion liquid 10 encapsulated within the capsule body 401 is produced by dispersing (or suspending) at least one kind of electrophoretic particles 5 (two kinds of electrophoretic particles 5, i.e., white particles 5a and colored particles 5b differing in color tone from the white particles 5a, in this embodiment) in a liquid-phase dispersion medium 6.

A task of dispersing the electrophoretic particles 5 in the liquid-phase dispersion medium 6 can be performed by using one or more of, e.g., a paint shaker method, a ball mill method, a media mill method, an ultrasonic dispersion method and a stirrer dispersion method.

A dispersion medium that exhibits low solubility to the capsule body 401 and has relatively high insulation performance is preferably used as the liquid-phase dispersion medium 6.

Examples of the liquid-phase dispersion medium 6 include: various kinds of water (e.g., distilled water, deionized water, ion-exchanged water and RO water); alcohol such as methanol, ethanol, isopropanol, butanol, octanol, ethylene glycol, diethylene glycol, glycerin and the like; cellosolve such as methyl cellosolve, ethyl cellosolve, phenyl cellosolve and the like; ester such as methyl acetate, ethyl acetate, butyl acetate, ethyl formate and the like; ketone such as acetone, methyl ethyl ketone, diethyl ketone, methyl isobutyl ketone, methyl isopropyl ketone, cyclohexanone and the like; aliphatic hydrocarbon (liquid paraffin) such as pentane, hexane, octane and the like; alicyclic hydrocarbon such as cyclohexane, methyl cyclohexane and the like; aromatic hydrocarbon including benzene with a long-chain alkyl group, such as benzene, toluene, xylene, hexyl benzene, heptyl benzene, octyl benzene, nonyl benzene, decyl benzene, undecyl benzene, dodecyl benzene, tridecyl benzene, tetradecyl benzene and the like; halogenated hydrocarbon such as methylene chloride, chloroform, carbon tetrachloride, 1,2-dichloroethane and the like; aromatic heterocycle such as pyridine, pyrazine, furan, pyrrole, thiophene, methyl pyrolidone and the like; nitrile such as acetonitrile, propionitrile, acrylonitrile and the like; amide such as N,N-dimethylformamide, N,N-dimethylacetamide and the like; carboxylic salt; and various kinds of oil. One or more of them may be used independently or in combination.

If necessary, various kinds of additive may be added to the liquid-phase dispersion medium 6 (electrophoretic dispersion liquid 10). Examples of such an additive include: a charge-controlling agent formed of particles of an electrolyte, a (anionic or cationic) surfactant, a metal soap, a resin material, a rubber material, a oil, a varnishe, compounds or the like; a dispersion agent such as a titanium-based coupling agent, an aluminum-based coupling agent, a silane-based coupling agent and the like; a lubricating agent; and a stabilizing agent.

Examples of such a surfactant include alkenyl succinate ester, alkenyl succinate polyimide, and the like.

Further, in the case where the liquid-phase dispersion medium 6 is colored, if necessary, a dye may be dissolved therein. Examples of the dye include various kinds of dye such as an anthraquinone-based dye, an azo-based dye, an indigoid-based dye, a triphenylmethane-based dye, a pyrazolone-based dye, a stilbene-based dye, a diphenylmethane-based dye, a xanthenes-based dye, an alizarine-based dye, an acridine-based dye, a quinonimine-based dye, a thiazole-based dye, a methine-based dye, a nitro-based dye, a nitros-based dye, and the like.

The electrophoretic particles 5 may be of any type as long as they are charged and can be electrophoretically moved in the liquid-phase dispersion medium 6 under the action of the electric fields. Although there is no particular limitation, at least one of pigment particles, resin particles and composite particles thereof may be preferably used as the electrophoretic particles 5. These kinds of particles provide advantages in that they can be manufactured with ease and can perform a charge-controlling task in a relatively easy manner.

Examples of a pigment of which pigment particles are made include: a black pigment such as aniline black, carbon black, titanium black, and the like; a white pigment such as titanium oxide, antimony oxide, barium sulfate, zinc sulfide, zinc oxide, silicon oxide, aluminum oxide and the like; an azo-based pigment such as monoazo, disazo, polyazo and the like; a yellow pigment such as isoindolinone, chrome yellow, yellow iron oxide, cadmium yellow, titanium yellow, antimony and the like; a red pigment such as quinacridone red, chrome vermilion and the like; a blue pigment such as phthalocyanine blue, indanthrene blue, iron blue, ultramarine blue, cobalt blue and the like; and a green pigment such as phthalocyanine green and the like. One or more of these pigments may be used independently or in combination.

Examples of a resin material of which resin particles are made include an acrylic-based resin, an urethane-based resin, an urea-based resin, an epoxy-based resin, polystyrene, polyester and the like. One or more of these resin materials may be used independently or in combination.

Examples of the composite particles include: particles produced by coating the surfaces of the pigment particles with the resin material or other pigment; particles produced by coating the surfaces of the resin particles with the pigment; and particles made of a mixture obtained by mixing the pigment and the resin material in a suitable composition ratio.

Examples of the particles produced by coating the surfaces of the pigment particles with other pigment include particles obtained by coating the surfaces of titanium oxide particles with silicon oxide or aluminum oxide. These particles are preferably used as the white particles 5a.

Carbon black particles or particles produced by coating the surfaces of the carbon black particles are preferably used as colored particles (black particles) 5b.

The shape of the electrophoretic particles 5 may preferably be, but is not particularly limited to a specific shape, a spherical shape. An average particle size of the electrophoretic particles 5 is preferably in the range of about 10 to 500 nm and more preferably in the range of about 20 to 300 nm.

If the average particle size of the electrophoretic particles 5 falls within the above-noted range, the electrophoretic particles 5 have a suitable size. Therefore, it is possible to reliably prevent the electrophoretic particles 5 from clumping together or sinking in the liquid-phase dispersion medium 6. As a result, it becomes possible to prevent degradation in the display quality of the electrophoretic display device 20.

In the case where two different particles of different colors are used as in the present embodiment, it is preferred that they have different average particle sizes. It is particularly preferred that the average particle size of the white particles 5a is set greater than that of the colored particles 5b. This makes it possible to increase the display contrast and retention characteristics of the electrophoretic display device 20.

More specifically, it is preferred that the colored particles 5b have an average particle size in the range of about 20 to 100 nm and the white particles 5a have an average particle size in the range of about 150 to 300 nm.

It is also preferred that a specific gravity of the electrophoretic particles 5 is set almost equal to that of the liquid-phase dispersion medium 6. This ensures that the electrophoretic particles 5 can stay in specified positions within the liquid-phase dispersion medium 6 for a prolonged period of time, even after a voltage application to between the first electrode 3 and the second electrodes 4 is stopped. That is to say, information displayed on the electrophoretic display device 20 is visibly retained for an extended period of time.

It is preferred that the properly-sized microcapsules 40 have the substantially uniform size. This allows the electrophoretic display device 20 to exhibit superior display performance while avoiding or reducing occurrence of variations in display.

With the present invention, it is preferred that the properly-sized microcapsules 40 are kept in a generally spherical shape.

With the present invention, the properly-sized microcapsules 40 have strength great enough to keep the spherical shape between the second electrodes 4 and the first electrode 3 even when pressure is applied between the base substrate 11 and the opposite substrate 12.

This makes it possible to increase pressure resistance and bleed resistance of the properly-sized microcapsules 40, thereby ensuring that the electrophoretic display device 20 is stably operated for a long period of time.

The phrase "pressure resistance of the properly-sized microcapsules 40" used herein refers to a property with which the properly-sized microcapsules 40 resist the pressure applied thereto without being crushed. The phrase "bleed resistance of the properly-sized microcapsules 40" used herein refers to a property with which the liquid dispersion medium 6 encapsulated into the properly-sized microcapsules 40 is kept against dissipation to the outside.

As for a particle size of the capsule body 401, a volume-average particle size thereof is preferably in the range of about 20 to 60 µm, and more preferably in the range of about 30 to 50 µm. If the volume-average particle size of the capsule body 401 falls within such a range, the properly-sized microcapsules 40 become hard and have high display characteristics.

Such properly-sized microcapsules 40 are arranged in a monolayer in a side by side relation through the length and breadth of the microcapsule-containing layer 400. In other words, the properly-sized microcapsules 40 are arranged one by one so as not to overlap in a thickness direction of the microcapsule-containing layer 400.

This makes it possible to reliably allow the electric fields to act on the properly-sized microcapsules 40 as compared to a case that a plurality layers are formed by overlapping the microcapsules 40 in the thickness direction of the microcapsule-containing layer 400. Therefore, movement of the electrophoretic particles 50 included in the properly-sized microcapsules 40 can be reliably controlled so that it is possible to improve the display contrast.

As described above, the upper portion of each of the properly-sized microcapsules 40 enters into the concave portions 101 which are formed on the lower surface of the base substrate 11, respectively. On the other hand, the lower portion of each of the properly-sized microcapsules 40 enters into the concave portions 201 which are formed on the upper surface of the opposite substrate 12, respectively.

In this way, by allowing the upper portions of the properly-sized microcapsules 40 to enter into the concave portions 101 and allowing the lower portions of the properly-sized microcapsules 40 to enter into the concave portions 201, it is possible to increase effective areas of both the first electrode 3 and the second electrodes 4 which can allow the electric fields to act on the properly-sized microcapsules 40.

As a result, a region in which the electrophoretic particles 5 can be moved increases inside the properly-sized microcapsules 40 so that the electrophretic display device 20 exhibits superior display performance.

Further, by allowing the upper portions of the properly-sized microcapsules 40 to enter into the concave portions 101 and allowing the lower portions of the properly-sized microcapsules 40 to enter into the concave portions 201, it is possible to reliably control positions of the properly-sized microcapsules 40 in the microcapsule-containing layer 400. Therefore, it is possible to reliably prevent the properly-sized microcapsules 40 from being ununiformly arranged in the microcapsule-containing layer 400.

Furthermore, the upper portions of the properly-sized microcapsules 40 are fixed in the concave portions 101 through the first binder layers 41, respectively.

Preferably used as the first binder layers 41 are a resin material that exhibits high affinity with (improved adhesion to) the first electrode 3 and the capsule bodies 401 (of the microcapsules 40) and exhibits increased insulation performance which does not allow a current to flow at all or allows a current to slightly flow.

Examples of such a resin material used as the first binder layers 41 include various kinds of resin materials such as an acryl-based resin, an olefin-based resin, an ABS resin, a vinyl chloride resin, a cellulose-based resin, a silicone-based resin, an urethane-based resin, and the like. One or more of these materials may be used independently or in combination.

Among these resin materials mentioned above, the first binder layers 41 is preferably constituted of the acryl-based resin as a main component thereof. Use of acryl-based resin makes it possible for the first binder layers 41 to exhibit superior translucency so that it is possible to improve display characteristics.

When the volume-average particle size of the (properly-sized) microcapsules 40 is defined as "d", the depth $D_1$ of each of the concave portions 101 is preferably in the range of about 0.1 d to 0.25 d, and more preferably in the range of about 0.1 d to 0.2 d, though may be arbitrarily set depending on the particle size of each of the (properly-sized) microcapsules 40.

By setting the depth $D_1$ of each of the concave portions 101 within above noted range, it is possible to sufficiently ensure the effective area of the surface of the first electrode 3 which can allow the electric fields to act on the (properly-sized) microcapsules 40.

Further, if the upper portion of one microcapsule 40 of the properly-sized microcapsules 40 enters into one concave portion 101 once by setting the depth $D_1$ of each of the concave portions 101 within above noted range, it is difficult for an upper portion of another microcapsule 40 (improperly-sized or properly-sized) to enter into the one concave portion.

Therefore, it is possible to reliably prevent the upper portions of a large number of the microcapsules 40 from entering into the one concave portion 101. As a result, it is possible to prevent variations in display from occurring in images displayed by the electrophoretic display device 20.

On the other hand, the lower portions of the properly-sized microcapsules 40 are fixed to the concave portions 201 through the second binder layer 42, respectively.

Preferably used as the second binder layer 42 is a resin material that exhibits high affinity with (improved adhesion to) the second electrodes 4 and the capsule bodies 401 (of the microcapsules 40) and exhibits increased insulation performance which does not allow a current to flow at all or allows a current to slightly flow.

A constituent material of such a second binder layer 42 can be used the same material as those of the first binder layers 41 described above.

When the volume-average particle size of the (properly-sized) microcapsules 40 is defined as "d", the depth $D_2$ of each of the concave portions 201 is preferably in the range of about 0.12 d to 0.5 d, and more preferably in the range of about 0.15 d to 0.3 d, though may be arbitrarily set depending on the particle size of each of the (properly-sized) microcapsules 40.

By setting the depth $D_2$ of each of the concave portions 201 within above noted range, it is possible to sufficiently ensure the effective area of the surface of each of the second electrodes 4 which can allow the electric fields to act on the properly-sized microcapsules 40.

Further, it is possible to sufficiently ensure gaps S between the second electrodes 4 and the first electrode 3. As a result, the electrophoretic display device 20 can reliably prevent the current flowing between the first electrode 3 and each second electrode 4 from being leaked. For these reasons, the manufactured electrophoretic display device 20 can exhibit superior display characteristics with reduced electricity consumption.

If the depth $D_1$ of each of the concave portions 101 is smaller than the lower limit value noted above, the lower surface area of the first electrode 3 is decreased. In other words, the surface area of each of the concave portions 101 is decreased.

Further, if the depth $D_2$ of each of the concave portions 201 is smaller than the lower limit value noted above, the upper surface area of each of second electrodes 4 (the upper surface of the base portion 2) is decreased. In other words, the surface area of each of the concave portions 201 is decreased.

Therefore, since the properly-sized microcapsules 40 bring into contact with each of the concave portions 101 and 201 by small contact areas, respectively, the electric fields can act on only small areas of the properly-sized microcapsules 40. As a result, there is a fear that display characteristics (contrast and the like) are lowered.

On the other hand, if each of the depth $D_1$ of each of the concave portions 101 and the depth $D_2$ of each of the concave portions 201 exceeds the upper limit value noted above, gaps S between the first electrode 3 and second electrodes 4 provided in the concave portions 201 become extremely long. As a result, there is a fear that a leak current between the first electrode 3 and each second electrode 4 are increased extremely.

Further, it is preferred that the depth $D_1$ of each of the concave portions 101 and the depth $D_2$ of each of the concave portions 201 are different from each other. This makes it possible to reliably fix the properly-sized microcapsules 40 to concave portions of which either of the concave portions 101 and the concave portions 201 is deeper, that is, deep concave portions.

On the other hand, due to shallow concave portions which opposites the deep concave portions, the gaps S between the first electrode 3 and second electrodes 4 can be set so as not to become extremely short.

In this regard, the depth $D_2$ of each of the concave portions 201 is deeper than the depth $D_1$ of each of the concave portions 101 in this embodiment.

The average thickness of each of the first binder layers 41 is preferably in the range of about 0.5 to 10 μm, and more preferably in the range of about 1 to 5 μm. This makes it possible to optimize optical transparency and bonding force of the first binder layers 41.

A constituent material of the second binder layer 42 is filled to gaps (interspaces) between the properly-sized microcapsules 40 as well as between the upper portions of the properly-sized microcapsules 40 and the concave portions 201 (second electrodes 4), respectively.

The properly-sized microcapsules 40 are fixed to predetermined positions, that is, positions between the concave portions 101 and the concave potions 201 by the constituent material to obtain the second binder layer 42. With this structure, the second binder layer 42 can insulate between the first electrode 3 and the second electrodes 4 reliably.

In this regard, the average thickness of the second binder layer 42 can be arbitrarily set depending on the particle size of each of the properly-sized microcapsules 40.

The sealing part 7 is provided between the base portions 1 and 2, and along peripheral edges of the first electrode 3, the second electrodes 4, and the microcapsule-containing layer 400. The first electrode 3, the second electrodes 4, and the microcapsule-containing layer 400 are air-tightly sealed by means of the sealing part 7.

This makes it possible to prevent moisture from infiltrating into the electrophoretic display device 20, thereby reliably avoiding degradation in display performance of the electrophoretic display device 20.

Various kinds of resin materials can be used as a constituent material of the sealing part 7. Examples of such resin materials include: an acryl-based resin, an urethane-based resin, an olefin-based resin, an epoxy-based resin, a melamine-based resin, a phenol-based resin, and the like. One or more of these resin materials may be used independently or in combination.

In this regard, it is to be noted that the sealing part 7 may be either provided or removed depending on the circumstances.

Such an electrophoretic display device 20 is operated as follows.

Hereinafter, a description will now be made regarding an operating method of the electrophoretic display device 20.

Figure 2A:
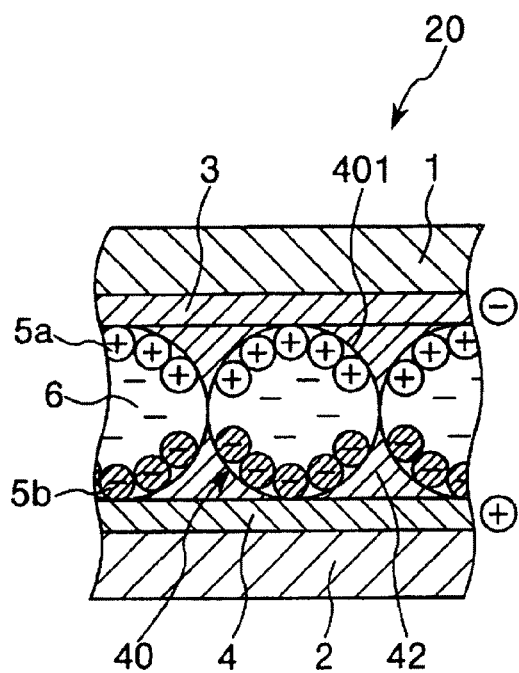
FIGS. 2A and 2B are pattern diagrams for explaining an operating method of the electrophoretic display device shown in FIG. 1.
Figure 2B:
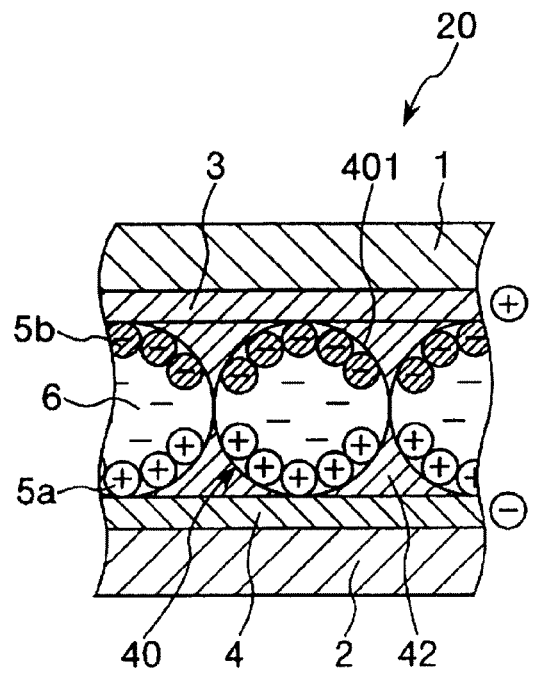

FIGS. 2A and 2B are pattern diagrams for explaining the operating method of the electrophoretic display device shown in FIG. 1. Hereinafter, the upper side in these figures will be referred to as "top" and the lower side will be referred to as "lower".

Upon applying a voltage to between the first electrode 3 and the second electrodes 4 of the electrophoretic display device 20, electric fields are generated across them. The electric fields allow the electrophoretic particles 5 (the colored particles 5b and the white particles 5a) to electrophoretically move toward the respective electrodes.

For example, if positively charged particles are used as the white particles 5a and negatively charged particles are used as the colored particles (black particles) 5b, and if the second electrodes 4 are kept in a positive electric potential as illustrated in FIG. 2A, the white particles 5a are moved toward and gathered on the first electrode 3.

On the other hand, the colored particles 5b are moved toward and gathered on the second electrodes 4. Therefore, when observing the electrophoretic display device 20 from the top thereof (namely, the display surface side), the color of the white particles 5a, i.e., a white color, is seen.

In contrast, if the second electrodes 4 are kept in a negative electric potential as illustrated in FIG. 2B, the white particles 5a are moved toward and gathered on the second electrodes 4. On the other hand, the colored particles 5b are moved toward and gathered on the first electrode 3. Therefore, when observing the electrophoretic display device 20 from the top thereof (namely, the display surface side), the color of the colored particles 5b, i.e., a black color, is seen.

If an electrifying amount of the electrophoretic particles 5 (the white particles 5a and the colored particles 5b), a polarity of the first electrode 3 and the second electrodes 4, potential differences between the first electrode 3 and the second electrodes 4 and the like are suitably set in the configuration set forth above, desired information (an image) is displayed on the display surface of the electrophoretic display device 20 according to the combination of colors of the white particles 5a and the colored particles 5b and the number of such particles gathered in the first electrode 3 and the second electrodes 4.

The concave portions 101 can be formed on the lower surface of the base portion 1 (base substrate 11) as needed. Further, the concave portions 201 can be also formed on the upper surface of the base portion 2 (opposite substrate 12) as needed. But they can be omitted.

Figure 3:
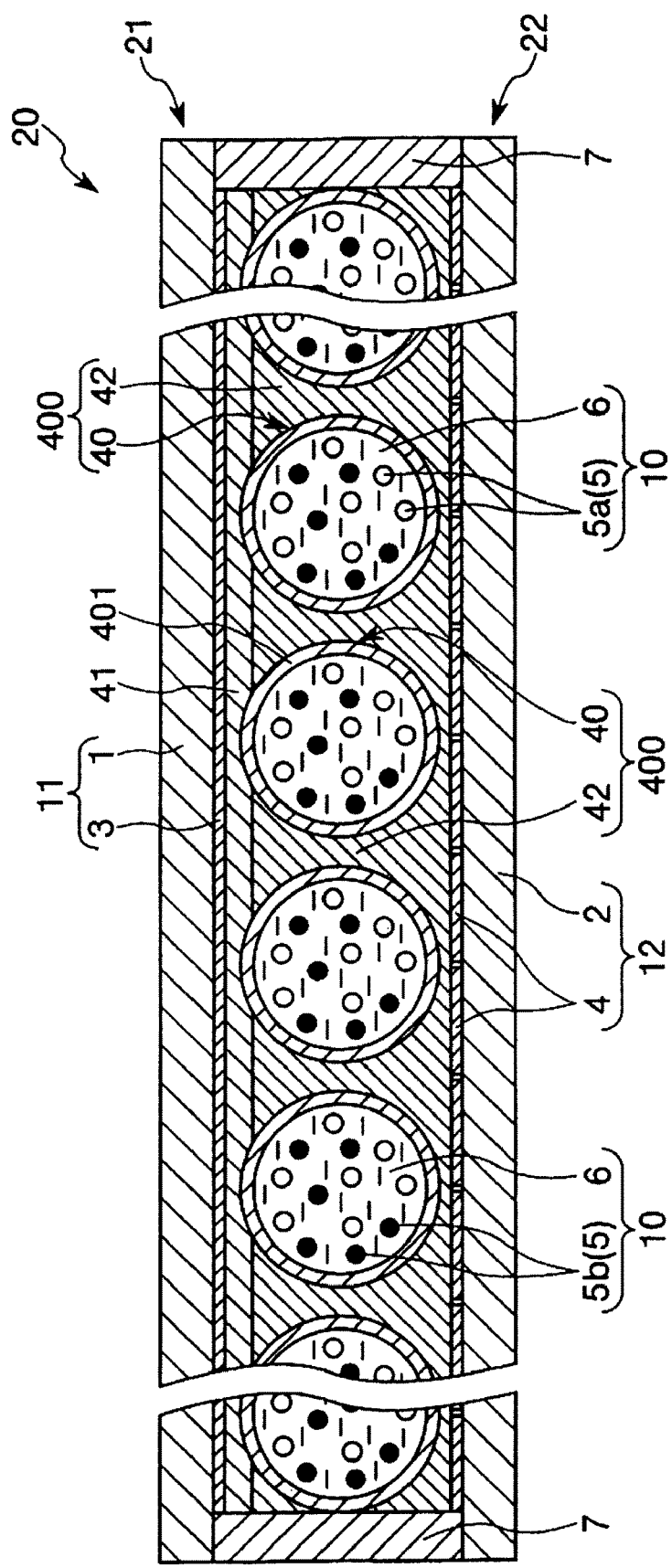
FIG. 3 is a pattern diagram showing a vertical section of another configuration example of the electrophoretic display device according to the present invention.

Next, a description will be made on another configuration example of the electrophoretic display device 20 according to the present invention. The electrophoretic display device 20 shown in FIG. 3 is a device in which the concave portions 101 and the concave portions 201 are omitted from the electrophoretic display device 20 shown in FIG. 1. That is to say, surfaces of a first electrode 3 and second electrodes 4 according to another configuration example are flat, respectively.

Method of Manufacturing Electrophoretic Display Device

First Embodiment

Next, a description will now be made on a first embodiment of a method of manufacturing the electrophoretic display device 20 shown in FIG. 1 (a method of manufacturing the electrophoretic display device according to the present invention).

FIGS. 4A to 4E are pattern diagrams for explaining the first embodiment of the method of manufacturing the electrophoretic display device according to the present invention. Hereinafter, the upper side in FIGS. 4A to 4E will be referred to as "top" and the lower side will be referred to as "lower".

The method of manufacturing the electrophoretic display device 20 according to the present invention includes six steps as follows. The first step (1A) is a step that a first electrode is formed on a plate-shaped base portion 1 on which a plurality of concave portions (hereinafter, simply referred to as "concave portions") 101 are formed to obtain a base substrate 11.

The second step (2A) is a step that first binder layers (sub-first binder layers) 41 are formed on the first electrode 3 provided in the concave portions 101. The third step (3A) is a step that a plurality of microcapsules (hereinafter, simply referred to as "microcapsules") 40 are supplied onto the first binder layers 41 and the first electrode 3 to fix properly-sized microcapsules 40 of the microcapsules 40 and obtain a electrophoretic display sheet 21.

The fourth step (4A) is a step that the improperly-sized microcapsules of the microcapsules 40, which do not bring into contact with the first binder layers 41, are removed from the electrophoretic display sheet 21. The fifth step (5A) is a step that a second binder layer 42 is formed on the first electrode 3 so as to cover the properly-sized microcapsules 40. The sixth step (6A) is a step that second electrodes 4 provided on a base portion 2 are provided on the second binder layer 42.

Hereinafter, a description will be made on each step one after another.

Figure 4A:
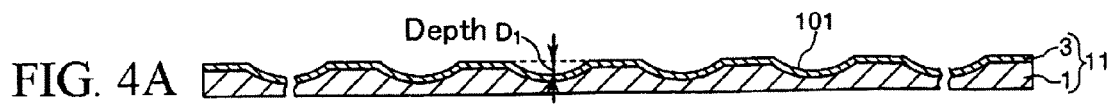
FIGS. 4A to 4E are pattern diagrams for explaining a first embodiment of a method of manufacturing the electrophoretic display device according to the present invention.

(1A) First, the base substrate 11 which includes a base portion 1 having the concave portions 101 and the first electrode 3 formed on an upper surface thereof is prepared as shown in FIG. 4A.

The first electrode 3 can be formed on the upper surface of the base portion 1 by using a deposition method such as various kinds of chemical vapor deposition methods, and various kinds of physical vapor deposition methods.

Figure 4B:
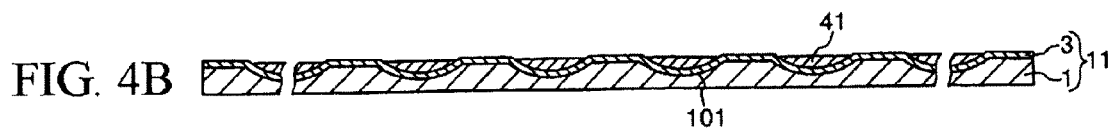

(2A) Next, the first binder layers 41 are formed on the first electrode 3 which is provided in the concave portions 101 as shown in FIG. 4B.

The first binder layers 41 can be formed as follows. A solution obtained by dissolving a constituent material of the first binder layers 41 to a solvent is supplied on the first electrode 3 provided in the concave portions 101 to obtain a liquid coating film. Thereafter, the solvent contained in the liquid coating film is removed to obtain the first binder layers 41.

Examples of such a solvent to be used the solution include: an inorganic solvent such as nitric acid, sulfuric acid, ammonia, hydrogen peroxide, water, carbon disulfide, and carbon tetrachloride; various kinds of organic solvents; an mixture solvent containing these solvents and the like. The various kinds of organic solvents include: a ketone-based solvent such as methyl ethyl ketone (MEK); an alcohol-based solvent such as methanol, ethanol, isopropanol, and ethylene glycol; an ether-based solvent such as diethylether, and 1,2-dimethoxyethane (DME); a cellosolve-based solvent such as methyl cellosolve, and phenyl cellosolve; aliphatic hydrocarbon such as hexane; aromatic hydrocarbon such as toluene; an aromatic heterocycle compound-based solvent such as methyl pyrolidone; an amide-based solvent such as N,N-dimethylformamide (DMF), and N,N-dimethylacetamide (DMA); a halogenated compound-based solvent such as dichloromethane, chloroform, and 1,2-dichloroethane; an ester-based solvent such as methyl acetate, ethyl acetate, and ethyl formate; a sulfur compound-based solvent such as dimethyl sulfoxid (DMSO), and sulfolane; a nitrile-based solvent such as acetonitrile, propionitrile, and acrylonitrile; an organic acid-based solvent such as formic acid, acetic acid, trichloroacetic acid, and trifluoroacetic acid.

Examples of a method of supplying the solution to the first electrode 3 include: a dipping method, a spin coating method, a casting method, a micro-gravure coating method, a gravure coating method, a bar coating method, a roll coating method, a wire bar coating method, a dip coating method, a spray coating method, a screen printing method, a flexographic printing method, an offset printing method, an inkjet method, and a micro-contact printing method. One or more of these methods may be used independently or in combination.

Examples of a method of removing the solvent from the liquid coating film include: a method of heating the liquid coating film, a method of irradiating infrared ray to the liquid coating film, a method of applying ultrasonic wave to the liquid coating film, and the like. One or more of these methods may be used independently or in combination.

As shown in FIG. 4A, a plurality of concave portions are formed on the upper surface of the base portion 1 by caving the upper surface of the base portion 1 in a concave-shape. The first electrode 3 is provided on the entire upper surface of the base portion 1 including the surfaces of the plurality of concave portions. In other words, the concave portions 101 formed by allowing the upper surface of the first electrode 3 corresponding to the plurality of concave portions to cave are provided on the upper surface of the base substrate 11.

As shown in FIG. 4B, the first binder layers 41 are selectively formed only in the concave portions 101.

The thickness of each of the first binder layers 41 provided in the concave portions 101 is preferably in the range of about 10 to 60%, and more preferably in the range of about 20 to 50 with respect to the depth $D_1$ of each of the concave portions 101.

By setting the thickness of each of the first binder layers 41 within above noted range, it is possible to ensure sufficient bonding force of the first binder layers 41 to the properly-sized microcapsules 40. Further, even if the constituent material of the first binder layers 41 is extruded out of the concave portions 101 by the properly-sized microcapsules 40 which have entered into the concave portions 101, it is possible to reliably prevent the extruded constituent material of the first binder layers 41 from rising up and bringing into contact with the second binder layer 42.

Further, by setting the thickness of each of the first binder layers 41 within above noted range, the particle size of the properly-sized microcapsules 40 to be fixed by the first binder layers 41 can be uniformed to same extent. Therefore, this means that it is difficult for extremely large microcapsules and extremely small microcapsules to bring into contact with the first binder layers 41, that is, it becomes difficult that these microcapsules are fixed to the first binder layers 41.

As a result, it is possible to remove the improperly-sized microcapsules 40 of the different sizes with ease, thereby being capable of preventing variations in display from occurring in images displayed by the electrophoretic display device 20.

Figure 4C:
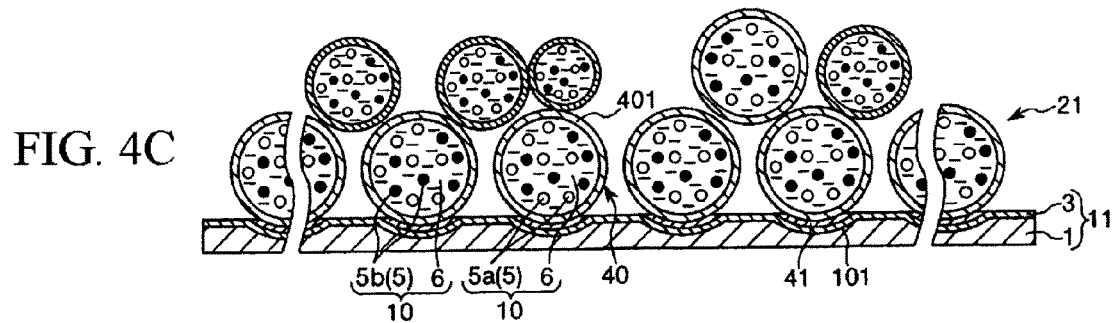

(3A) Next, as shown in FIG. 4C, the microcapsules 40 are supplied onto the first binder layers 41 and the first electrode 3. In this way, the electrophoretic display sheet 21 is obtained. In the electrophoretic display sheet 21, the properly-sized microcapsules 40 are fixed onto the first electrode 3 through the first binder layers 41.

The supply of the microcapsules 40 is carried out as follows. First, a dispersion liquid (microcapsule dispersion liquid) in which the microcapsules 40 are dispersed in a dispersion medium is prepared, and then the dispersion liquid is supplied onto the base substrate 11. Thereafter, the dispersion medium contained in the dispersion liquid is removed.

The dispersion medium is used the same solvents as the solvents described above. Among the solvents described above, the dispersion medium of which specific gravity is smaller than that of the microcapsules (in particular, the properly-sized microcapsules) 40 is preferable.

Use of such a solvent makes it possible to rapidly settle down the properly-sized microcapsules 40 when the microcapsule dispersion liquid is supplied onto the base substrate 11. Therefore, it is possible to efficiently arrange only properly-sized microcapsules 40 on the first binder layers 41.

The dispersion medium has preferably volatile property. By using the dispersion medium having volatile property, the dispersion medium can be reliably volatilized and removed in the step in which the dispersion medium is removed as described later. This makes it possible to more easily arrange the only properly-sized microcapsules 40 on the first binder layers 41.

The method of supplying the dispersion liquid can be used the same method as that of supplying the liquid described in the step (2A).

Further, the method of removing the dispersion medium can be used the same method as that of removing the dispersion medium described in the step (2A).

After the microcapsules 40 are supplied on the base substrate 11, as needed, the properly-sized microcapsules 40 are compressed so as to press to the first binder layers 41.

In this way, the relatively large microcapsules (properly-sized microcapsules) are pushed preferentially, thereby enabling the relatively large microcapsules to preferentially enter into the concave portions 101 provided on the base substrate 11.

On the other hand, some of the relatively small microcapsules (the improperly-sized microcapsules) exist between the relatively large microcapsules which have entered into the concave portions 101. Others of the relatively small microcapsules exist in interspaces between the relatively large microcapsules and the first electrode 3.

However, the others of the relatively small microcapsules are brought to the upper portions of the relatively large microcapsules. As a result, the microcapsules 40 supplied on the base substrate 11 can be sorted into properly-sized microcapsules 40 which can enter into the concave portions 101 and the improperly-sized microcapsules which can not enter into the concave portions 101 by the size thereof.

In this case, a pressure of pushing the properly-sized microcapsules 40 is preferably in the range of about 0.01 to 0.2 MPa, and more preferably in the range of about 0.05 to 0.1 MPa. By setting the pressure within the above noted range, it is possible to reliably press the properly-sized microcapsules 40 to the first binder layers 41 without breaking the properly-sized microcapsules 40, respectively.

Further, after the microcapsules 40 are supplied onto the base substrate 11, the first binder layers 41 are heated as needed. In this way, adhesion property is developed in the first binder layers 41 so that the properly-sized microcapsules 40 can be reliably fixed onto the first binder layers 41.

In this regard, a heating temperature of the first binder layers 41 is in the range of about 50 to 120° C., and more preferably in the range of about 70 to 100° C., though may be arbitrarily set depending on the constituent material of the first binder layers 41.

By setting the heating temperature of the first binder layers 41 within the above noted range, it is possible to prevent the properly-sized microcapsules 40 from being altered and deteriorated due to the heat while generating adhesion property sufficiently in the first binder layers 41.

(4A) Next, the improperly-sized microcapsules of the microcapsules 40, which do not bring into contact with the first binder layers 41, are removed from the erelctophoretic display sheet 21. In this way, the properly-sized microcapsules 40 can be arranged one by one so as not to overlap in a thickness direction of the base substrate 11. This makes it possible to reliably allow the electric fields to act on the properly-sized microcapsules 4, thereby enabling the display contrast to improve in the electrophoretic display device 20.

Examples of a method of removing such properly-sized microcapsules include a method of tilting the erelctophoretic display sheet 21, a method of applying vibration to the erelctophoretic display sheet 21, and a method of combining them.

Figure 4D:
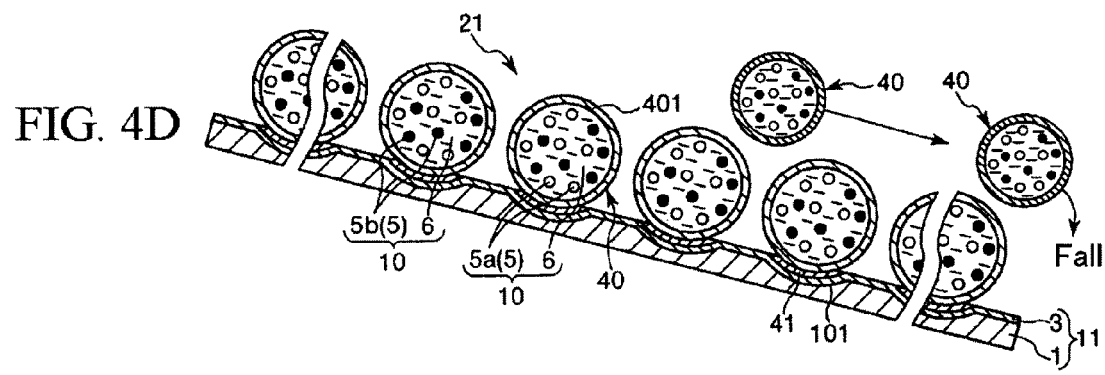

In the case where the erelctophoretic display sheet 21 is tilted as shown in FIG. 4D, the microcapsules 40 which could have not entered into the concave portions 101, that is, the improperly-sized microcapsules 40 which do not bring into contact with the first binder layers 41 fall from the erelctophoretic display sheet 21.

Figure 4E:
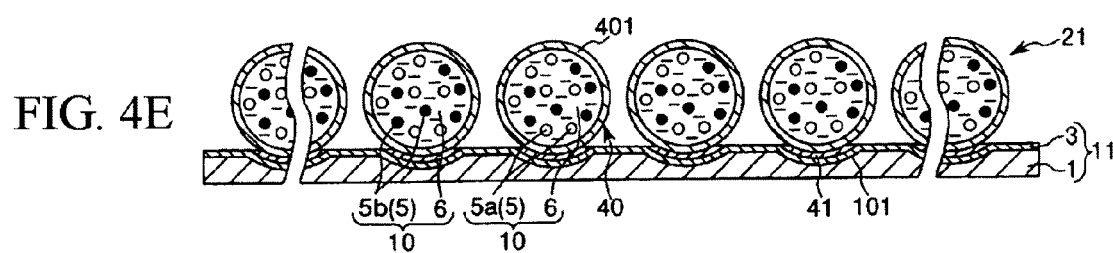

As a result, only properly-sized microcapsules 40 which have entered into the concave portions 101 remain on the base substrate 11 as shown in FIG. 4E. The improperly-sized microcapsules 40 are removed from the erelctophoretic display sheet 21 with ease.

On the other hand, in the case where the vibration is applied to the erelctophoretic display sheet 21 as needed, the microcapsules 40 which could have not entered into the concave portions 101, that is, the improperly-sized microcapsules 40 which do not bring into contact with the first binder layers 41 are shaken from the erelctophoretic display sheet 21.

As a result, only properly-sized microcapsules 40 which have entered into the concave portions 101 remain on the base substrate 11. The improperly-sized microcapsules are removed from the erelctophoretic display sheet 21 with ease.

In the meantime, in a method of manufacturing a conventional electrophoretic display device, microcapsules have been arranged on an electrode by supplying a microcapsule dispersion liquid in which the microcapsules are dispersed in a binder solution on the electrode, and drying the supplied microcapsule dispersion liquid.

In this method, it has occurred many times that the microcapsules are overlapped with each other in a thickness direction of a base substrate. The overlap of the microcapsules makes it possible to prevent electrophoretic particles from being moved, thereby lowering contrast.

Further, in the method of manufacturing the conventional electrophoretic display device, there has been a problem that bubbles are mixed in the supplied microcapsule dispersion liquid. The mixed bubbles prevent electric fields from acting on the microcapsules so that the movement of the electrophoretic particles is prevented. As a result, there has been a problem that images are not displayed accurately.

Furthermore, there is a fear that metal ions which had been inevitably contained in the microcapsule dispersion liquid disperse in the binder solution. The metal ions cause between electrodes to generate leak current.

In contrast, according to the method of manufacturing the electrophoretic display device of this embodiment, since the supplying step of the microcapsules 40 and the forming steps of the first binder layers 41 and the second binder layer 42 are carried out separately, the improperly-sized microcapsules 40 which are not fixed by the first binder layers 41 fall from the erelctophoretic display sheet 21 with ease.

Therefore, it becomes difficult that the properly-sized microcapsules 40 are overlapped with each other in the thickness direction of the base substrate 11. As a result, it is possible to efficiently arrange the properly-sized microcapsules 40 in a monolayer, thereby enabling the contrast of display to improve.

Further, by sorting the microcapsules 40 depending on the size thereof as described above, it is possible to uniform the size of the properly-sized microcapsules to be fixed by the first binder layers 41. This makes it possible to reduce variations in display of images displayed by the electrophoretic display device 20.

Furthermore, since no process of mixing the microcapsules and the binder is carried out in the method according to present invention, the method according to the present invention has an advantage that it is difficult for the bubbles to mix in the first binder layers 41 and the second binder layer 42. Therefore, the movement of the electrophoretic particles 5 is not prevented so that the images can be displayed accurately.

Furthermore, since it is difficult for the metal ions to disperse in the first binder layers 41 and the second binder layer 42, it is possible to prevent leak current from occurring between the first electrode 3 and the second electrodes 4.

Further, the depth $D_1$ of each of the concave portions 101 provided in the base portion 1 are shallower than that of each of the concave portions 201 provided in the base portion 2.

When the volume-average particle size of the properly-sized microcapsules 40 is defined as "d", the depth $D_1$ of each of the concave portions 101 is preferably in the range of about 0.1 d to 0.25 d.

By setting the depth $D_1$ of each of the concave portions 101 within above noted range so as to be relatively shallow, the relatively large microcapsules (properly-sized microcapsules) 40 enter into the concave portions 101. Therefore, it is difficult for the relatively small microcapsules (the improperly-sized microcapsules) 40 to enter into the concave portions 101. As a result, it is possible to reliably sort the microcapsules 40 in the size thereof.

(5A) Next, a solution containing a constituent material of the second binder layer 42 is supplied onto the properly-sized microcapsules 40 and the first electrode 3 (electrophoretic display sheet 21) in the same manner as the method of supplying the first binder layers 41 on the first electrode 3 described above. In this way, the solution fills the gaps between the properly-sized microcapsules 40 and liquid coating films are formed on the properly-sized microcapsules 40.

Thereafter, by drying the supplied solution, the second binder layer 42 is formed on the properly-sized microcapsules 40 and in the gaps between the properly-sized microcapsules 40. That is to say, the second binder layer 42 is formed on the first electrode 3 so as to cover the properly-sized microcapsules 40.

The second binder layer 42 may be formed so as to bring into contact with the first binder layers 41, but is preferably formed so as not to bring into contact with the first binder layers 41. In this case, if the solution to form the second binder layer 42 does not run down in a downward direction of the electrophoretic display sheet 21, that is, the solution does not flow to the gaps (first electrode 3), the second binder layer 42 can be formed so as not to bring into contact with the first binder layers 41.

Concretely, the solution to form the second binder layer 42 is set so that a viscosity thereof becomes high. This makes it possible to lower fluidity of the solution, thereby being capable of preventing the solution from flowing to the first electrode 3.

In this regard, the viscosity of the solution can be adjust by arbitrarily setting a mixing ratio of the constituent material of the second binder layer 42 and the solvent, a temperature of the solution, and the like.

(6A) Next, the second electrodes 4 provided on the base portion 2 (opposite substrate 12) is set on the second binder layer 42 as shown in the FIG. 5G. The second electrodes 4 can be formed on the lower surface of the base portion 2 by using the same method as that of the first electrode 3 described above.

Further, the concave portions 201 are formed on the lower surface of the opposite substrate 12 by allowing the lower surface of the opposite substrate 12 to cave in the upper direction thereof as shown in FIG. 5G.

After the step (6A) has been carried out, the base portions 1 and 2 are compressed so as to approach them as needed. This makes it possible to reliably allow the properly-sized microcapsules 40 to enter into the concave portions 201 as shown in FIG. 5H.

As a result, the lower portions of the properly-sized microcapsules 40 can enter into the concave portions 101, respectively, and the upper portions of the properly-sized microcapsules 40 can enter into the concave portions 201, relatively. This makes it possible to reliably control positions of the properly-sized microcapsules 40 in the microcapsule-containing layer 401.

Further, the first binder layers 41 and the second binder layer 42 are heated as needed like the step (3A). In this way, adhesion property is developed in the first binder layers 41 and the second binder layer 42 so that the properly-sized microcapsules 40 can be reliably fixed onto the first binder layers 41 and the second binder layer 42.

Next, as illustrated in FIG. 5I, the sealing portion 7 is formed along the edges of the first electrode 3, the second electrodes 4, the second binder layer 42, and the properly-sized microcapsules 40.

The sealing portion 7 can be formed by supplying a sealing portion formation material to between the base portion 2 and the base portion 1 along the edges thereof through use of, e.g., a dispenser, and then solidifying or curing the sealing portion formation material.

The electrophoretic display device 20 shown in FIG. 1 is manufactured through the steps described above.

Second Embodiment

Next, a description will be made on a second embodiment of the method of manufacturing the electrophoretic display device 20 shown in FIG. 1 (the method of manufacturing the electrophoretic display device according to the present invention).

Figure 6A:
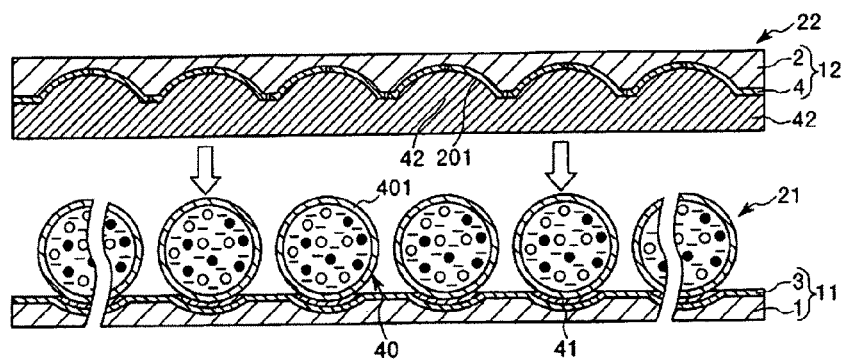
FIGS. 6A to 6C are pattern diagrams for explaining a second embodiment of a method of manufacturing the electrophoretic display device according to the present invention.
Figure 6B:
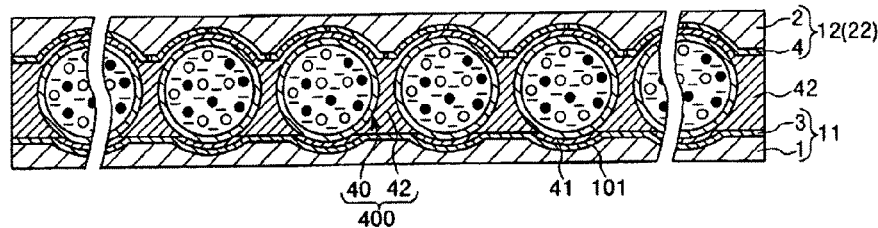
Figure 6C:
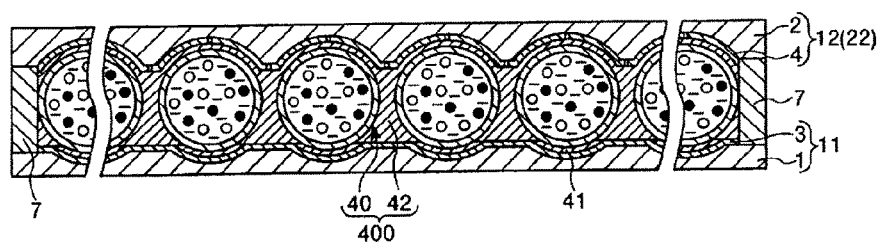

FIGS. 6A to 6C are pattern diagrams for explaining a second embodiment of a method of manufacturing the electrophoretic display device according to the present invention. In the following description, the upper side in FIGS. 6A to 6C will be referred to as "upper" with the lower side as "lower", for the purpose of convenience in description.

Hereinafter, the method of manufacturing the electrophoretic display device of the second embodiment will be described, with emphasis placed on the differing points from the electrophoretic display device of the first embodiment but with no description made on the same matters.

The method of manufacturing the electrophoretic display device according to this embodiment is the same as the method of the first embodiment, except that a fifth step and a sixth step are different from those of the method of the first embodiment.

In other words, the method of manufacturing the electrophoretic display device 20 according to this embodiment includes six steps as follows.

The first step (1B) is a step that a first electrode is formed on a plate-shaped base portion 1 on which concave portions 101 are formed to obtain a base substrate 11. The second step (2B) is a step that first binder layers (sub-first binder layers) 41 are formed on the first electrode 3 provided in the concave portions 101.

The third step (3B) is a step that microcapsules 40 are supplied onto the first binder layers 41 and the first electrode 3 to fix properly-sized microcapsules 40 of the microcapsules 40 and obtain an electrophoretic display sheet 21. The fourth step (4B) is a step that the improperly-sized microcapsules of the microcapsules 40, which do not bring into contact with the first binder layers 41, are removed from the electrophoretic display sheet 21.

The fifth step (5B) is a step that a second binder layer 42 is preliminarily formed on the lower surface of a plate-shaped opposite substrate 12 on which concave portions 201 are formed. The opposite substrate 12 are formed from a base portion 2 having the concave portions 201 and second electrodes formed on a lower surface of the base portion 2 and in the concave portions 201.

The sixth step (6B) is a step that second binder layer 42 is provided on the properly-sized microcapsules 40 so that the concave portions 201 provided on the lower surface of the opposite substrate 12 correspond to the properly-sized microcapsules 40. Then, the properly-sized microcapsules 40 are allowed the second binder layer 42 to adhere.

In this regard, the fifth step (5B) and the sixth step (6B) can be carried out simultaneously. Hereinafter, a description will be made on each step one after another.

(1B) First, the base portion 1 provided with the concave portions 101 and the first electrode 3 formed on an upper surface thereof, that is, the base substrate 11 is prepared in the same manner as the first embodiment described above.

(2B) Next, the first binder layers 41 are formed on the first electrode 3 provided in the concave portions 101 in the same manner as the first embodiment described above as shown in FIG. 4B.

(3B), (4B) Next, as shown in FIG. 4C, the microcapsules 40 are supplied onto the first electrode 3 and the first binder layers 41 in the same manner as the first embodiment described above to fix the properly-sized microcapsules onto the first binder layers 41. In this way, an electrophoretic display sheet (front plane) 21 is obtained.

(5B) Next, the second electrodes 4 are formed on the lower surface of the base portion 2 as shown in FIG. 6A to obtain a circuit substrate (back plane) 22 (opposite substrate 12). Next, as shown in FIG. 6A, the second binder layer 42 is formed on the lower surface of the opposite substrate 12. The second binder layer 42 is formed in the same manner as the first embodiment described above.

In this regard, the opposite substrate 12 have the concave portions 201 on the lower surface thereof like that of the first embodiment described above. The second electrodes 4 are formed on the entire lower surface of the base portion 2.

Further, the second binder layer 42 is formed on entire lower surface of the opposite substrate 12 so as to cover the second electrodes 4. A part of a constituent material of the second binder layer 42 enters into the concave portions 201 as described later. As a result, the part of the constituent material the second binder layer 42 entering into the concave portions 201 exhibits an anchor effect, thereby the second binder layer 42 are reliably allowed to adhere to the second electrodes 4.

The formation of the second binder layer 42 normally is carried out in a state that surfaces of the second electrodes 4 to form it are turn up (in a state that base substrate 12 as shown in FIG. 6A is reversed up and down). After the second binder layer 42 is formed on the second electrodes 4, the opposite substrate 12 provided with the second binder layer 42 is reversed up and down again to set in a state as shown in FIG. 6A.

At that time, the second binder layer 42 does not fall from the second electrodes 4 by its own weight due to a gravity thereof. That is, the second binder layer 42 can adhere to the second electrodes 4 reliably. This is because the second binder layer 42 adheres to the second electrodes 4 reliably as described above.

(6B) Next, the opposite substrate 12 (circuit substrate 22) is provided on the electrophoretic display sheet 21 so that the properly-sized microcapsules 40 adhere to the second binder layer 42 as shown in FIG. 6A and FIG. 6B. Thereafter, the sealing portion 7 is formed along the edges of the first electrode 3, the second electrodes 4, the second binder layer 42, and the properly-sized microcapsules 40. By carrying out above steps, the electrophoretic display device 20 as shown in FIG. 1 is manufactured as shown in FIG. 6C.

When the second binder layer 42 provided to the opposite substrate 12 is provided on the properly-sized microcapsules 40 of the electrophoretic display sheet 21, the second binder layer 42 may be provided from the lower side of the electrophoretic display sheet 21 to the properly-sized microcapsules 40 in a state that the electrophoretic display sheet 21 is set so that the surface of the base substrate 11 on which the properly-sized microcapsules 40 are provided faces in a vertical direction. Such an providing step is reversely carried out to that shown in FIG. 6A.

In such an providing step, some unnecessary (improperly-sized) microcapsules 40 of the microcapsules 40 (that is, microcapsules 40 overlapping in the thickness direction of the base substrate 11), which do not bring into contact with the first binder layers 41, fall from the electrophoretic display sheet 21 by itself in the step that the second binder layer 42 provided to the opposite substrate 12 is provided on the properly-sized microcapsules 40 of the electrophoretic display sheet 21.

Therefore, the unnecessary microcapsules 40, that is, the improperly-sized microcapsules 40 can be removed from the electrophoretic display sheet 21 with ease without subjecting to a specific treatment.

In this embodiment, since the fifth step and the sixth step can be carried out simultaneously, it is possible to improve working efficiency. Further, the second binder layer 42 is provided to the properly-sized microcapsules 40 of the electrophoretic display sheet 21 in a state that the second binder layer 42 is preliminarily formed on the second electrodes 4. Therefore, the present invention can be obtained an advantage in that it is difficult for bubbles to mix between the second binder layer 42 and the second electrodes 4.

The electrophoretic display device 20 manufactured as described above can display images having high contrast and reduced variations in display. The electrophoretic display device 20 manufactured as described above can also exhibit superior display performance.

Electronic Device

The electrophoretic display device 20 described above can be used for constituting a variety of electronic device. Hereinafter, a description will be made on examples of the electronic device of the present invention provided with the electrophoretic display device 20.

Electronic Paper

Figure 7:
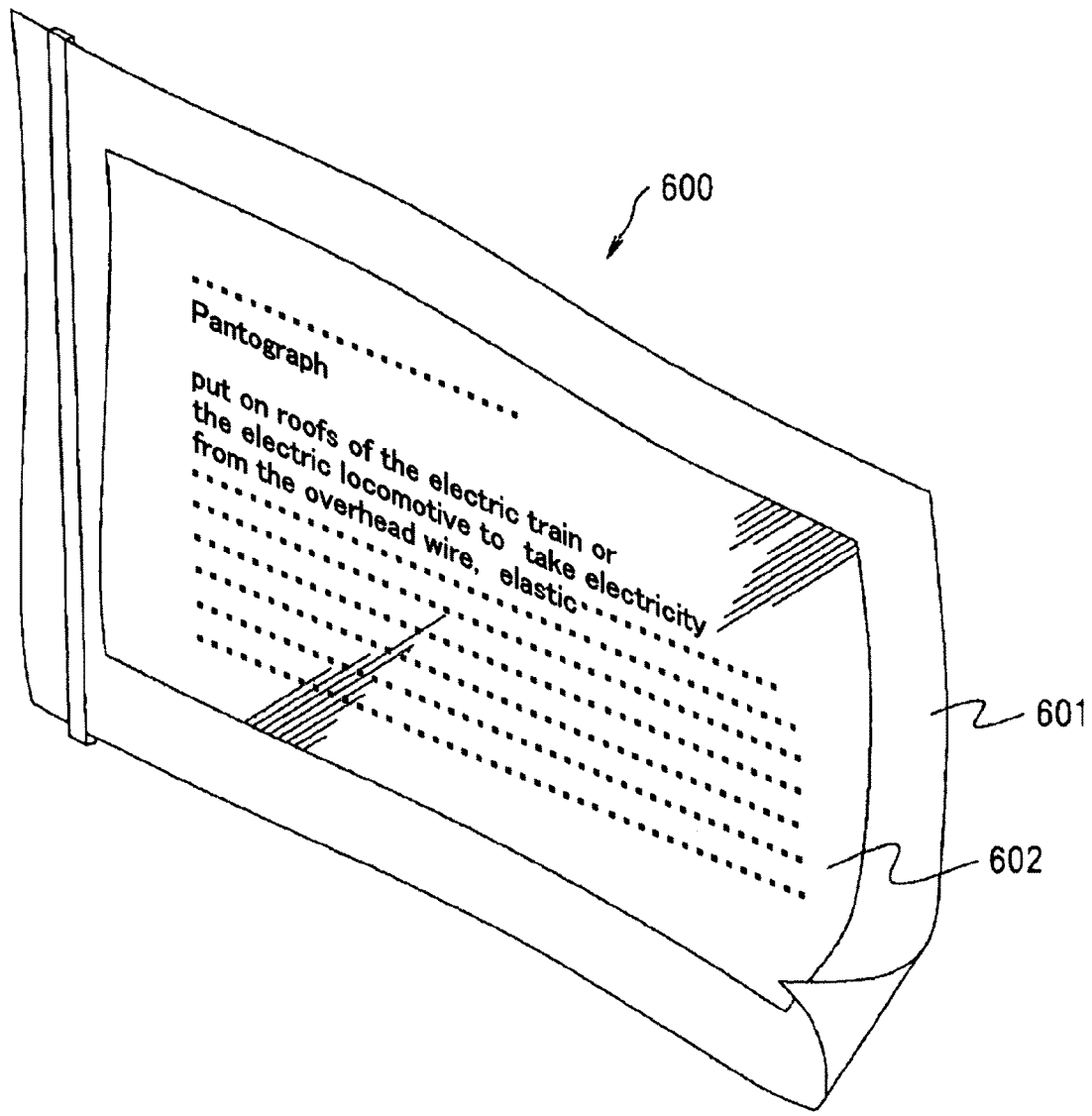
FIG. 7 is a perspective view showing an embodiment in which the electronic device according to the present invention is used in an electronic paper.

First, a description will be offered regarding an embodiment in which the electronic device of the present invention is used in an electronic paper. FIG. 7 is a perspective view showing an embodiment in which the electronic device according to the present invention is used in an electronic paper.

The electronic paper 600 shown in FIG. 7 includes a main body 601 formed of a rewritable sheet having the same texture and flexibility as that of a paper sheet, and a display unit 602 attached to the main body 601. In the electronic paper 600, the display unit 602 is formed from the electrophoretic display device 20 described above.

Display Device

Figure 8A:
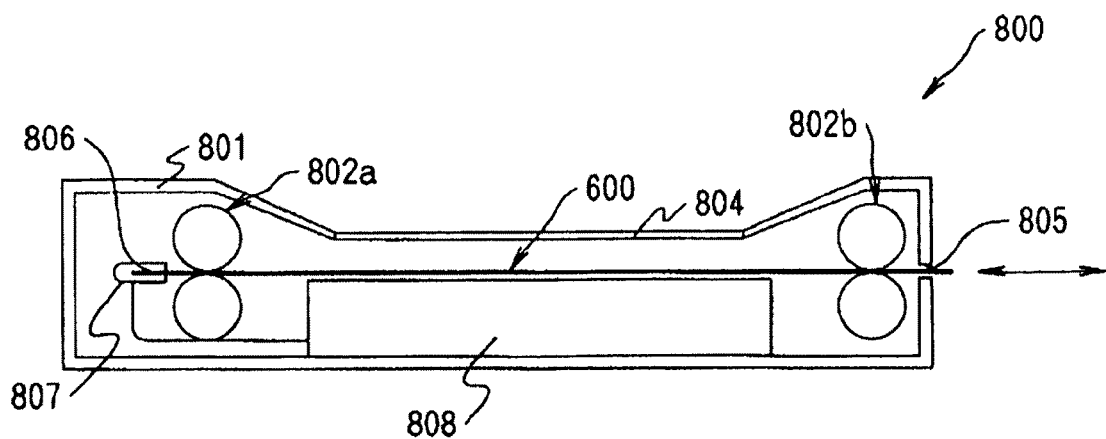
FIGS. 8A and 8B are section and plan views showing an embodiment in which the electronic device according to the present invention is used in a display device.
Figure 8B:
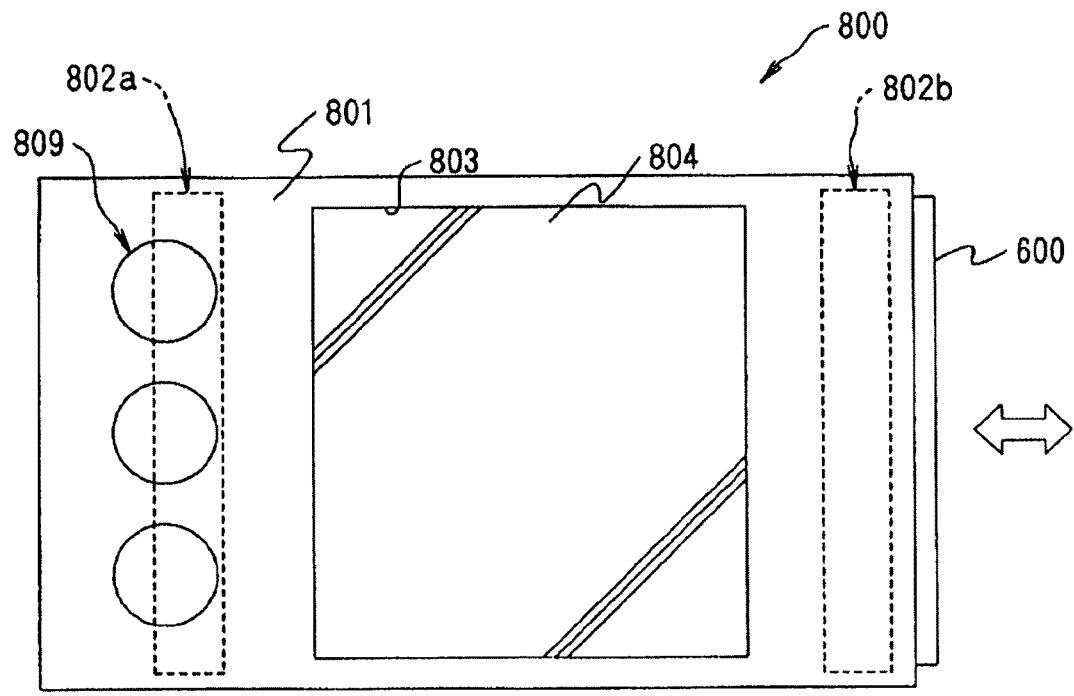

Next, a description will be offered regarding an embodiment in which the electronic device of the present invention is used in a display device. FIGS. 8A and 8B are section and plan views showing an embodiment in which the electronic device according to the present invention is used in a display device.

The display device 800 shown in FIGS. 8A and 8B include a main body portion 801 and an electronic paper 600 detachably attached to the main body portion 801. The electronic paper 600 is of the same configuration as set forth above, i.e., the same configuration as shown in FIGS. 8A and 8B.

Formed on one lateral side (the right side in FIG. 8A) of the main body portion 801 is an insertion slot 805 through which the electronic paper 600 can be inserted. Two pairs of conveying rollers 802a and 802b are provided within the main body portion 801.

When the electronic paper 600 is inserted into the main body portion 801 through the insertion slot 805, the electronic paper 600 is held within the main body portion 801 in a state that it is gripped by means of the pairs of conveying rollers 802a and 802b.

A rectangular opening 803 is formed on a display surface side (the front side in FIG. 8B) of the main body portion 801 and a transparent glass plate 804 is fitted to the rectangular opening 803. This allows the electronic paper 600 held within the main body portion 801 to be visually recognized from the outside of the main body portion 801.

In other words, the display device 800 has a display surface that allows the electronic paper 600 held within the main body portion 801 to be visually recognized through the transparent glass plate 804.

A terminal portion 806 is formed in a leading edge portion (the left side in FIGS. 8A and 8B) of the electronic paper 600. Provided within the main body portion 801 is a socket 807 that makes contact with the terminal portion 806 when the electronic paper 600 is placed within the main body portion 801. A controller 808 and an operation part 809 are electrically connected to the socket 807.

In the display device 800 set forth above, the electronic paper 600 is removably fitted to the main body portion 801 and is portable in a state that it is removed from the main body portion 801.

Furthermore, the electronic paper 600 of the display device 800 is formed from the electrophoretic display device 20 described above.

In this regard, it is to be noted that the electronic device of the present invention is not limited to the uses as described above. Examples of other uses of the electronic device include a television set, a viewfinder type or monitor viewing type video tape recorder, a car navigation system, a pager, a personal digital assistance, an electronic calculator, an electronic newspaper, a word processor, a personal computer, a workstation, a picture phone, a POS terminal, a device provided with a touch panel and the like. The present electrophoretic display device 20 can be used in display parts of the various kinds of electronic device described above.

Although the method of manufacturing the electrophoretic display device, the electrophoretic display device and the electronic device of the present invention have been described with reference to the illustrated embodiments, the present invention is not limited thereto. The configuration of each component may possibly be replaced by other arbitrary configurations having equivalent functions. It may also be possible to add other optional components to the present invention.

Furthermore, although each of the microcapsules is arranged to extend over two neighboring pixel electrodes in the foregoing embodiments, the present invention is not limited thereto. As an alternative example, each of the microcapsules may be arranged to extend over three neighboring pixel electrodes or may be arranged not to extend over neighboring electrodes. It may also be possible to employ the combination of these arrangements.

Furthermore, the method of manufacturing the electrophoretic display device of the present invention may be provided by combining two or more arbitrary steps (features) employed in the respective embodiments described above. In the method for manufacturing electrophoretic display device of the present invention, one or more step may be added for an arbitrary purpose.

EXAMPLES

Next, a description will be made on specific experimental examples of the present invention.

1. Manufacture of Electrophoretic Display Device

Example 1

<1> First, a PET substrate (base portion) constituted of aluminium, provided with concave portions on an entire surface thereof, was prepared. Next, a first electrode was formed on the surface of the PET substrate to obtain a base substrate. In this way, concave portions corresponding to the concave portions were also provided on a surface of the first electrode. An average depth of each of the concave portions of the PET substrate and the concave portions of the first electrode was 5 µm.

Further, a binder solution was prepared by dissolving an acryl-based resin to a ketone-based solvent. Next, the binder solution was supplied into the concave portions of the first electrode, and then the supplied binder solution was dried to obtain first binder layers.

In this regard, it is to be noted that the first binder layers were selectively provided only in the concave portions of the first electrodes. Further, an average thickness of the first binder layers was 2 µm.

<2> Next, a plurality of microcapsules including a electrophoretic dispersion liquid (of which volume-average particle size was 40 µm) were prepared, and then a microcapsule dispersion liquid was prepared by dispersing the plurality of microcapsules to a dispersion medium.

Next, the microcapsule dispersion liquid was supplied onto the first binder layers and the first electrode, and the supplied microcapsule dispersion liquid was dried. In this way, properly-sized microcapsules of the plurality of microcapsules were arranged on the first binder layers.

Thereafter, the properly-sized microcapsules were pushed to the first binder layers by a power of 0.1 MPa. In this way, the properly-sized microcapsules (relatively large microcapsules) entered into the concave portions provided on the first electrode.

Next, the base substrate on which the properly-sized microcapsules were arranged, that is, an electrophoretic display sheet was tilted to obtain tilt. The tilt makes it possible to allow improperly-sized microcapsules of the plurality of microcapsules, which could not enter into the concave portions of the first electrode, that is, relatively small microcapsules to selectively fall from the electrophoretic display sheet.

<3> Next, a binder solution was prepared by dissolving an acryl-based resin to a ketone-based solvent. Next, the binder solution was supplied onto the first electrode so as to cover the properly-sized microcapsules fixed on the first binder layers.

In this way, a liquid coating film of the binder solution was formed on the properly-sized microcapsules and the binder solution was filled into gaps between the properly-sized microcapsules. Thereafter, the supplied binder solution was dried to obtain a second binder layer.

<4> Further, a PET substrate (base portion) constituted of ITO, provided with concave portions on an entire surface thereof, was prepared. Next, second electrodes were formed on the entire surface of the PET substrate to obtain an opposite substrate. In this way, the second electrodes were provided on the surface of the PET substrate and in the concave portions.

An average depth of the concave portions of the PET substrate was 10 µm. TFT circuits were formed on the PET substrate preliminarily.

Next, the second electrodes provided on the PET substrate was provided on the second binder layer so that the second electrodes adhere to the second binder layer, that is, the concave portions of the PET substrate correspond to the properly-sized microcapsules. As a result, the PET substrate, the first electrode, the first binder layers, the properly-sized microcapsules, the second binder layer, the second electrodes, and the PET substrate were laminated in this order to obtain a laminated body.

<5> Next, the laminated body was compressed by a pressure of 0.1 MPa in a thickness direction thereof, and then the properly-sized microcapsules entered into the concave portions in which the second electrodes were provided. Next, the compressed laminated body was heated at a temperature of 80° C.

In this way, adhesive property of each of the first binder layers and the second binder layer was improved so that the properly-sized microcapsules were fixed onto the concave portions in which the second electrodes were provided and the concave portions which are provided on the first electrode.

Next, an edge (an outer circumferential portion) of the laminated body obtained in the step (A4) was sealed off with an epoxy-based adhesive agent, to thereby obtain an electrophoretic display device as shown in FIG. 1.

Example 2

An electrophoretic display device was manufactured in the same manner as the Example 1 except that the following steps were carried out. By using the binder solution obtained in the step (3) of the Example 1, a second binder layer was formed on a surface of the opposite substrate in which the second electrodes were formed on the base portion. Thereafter, the formed second binder layer was provided on the properly-sized microcapsules so that the second binder layer brought into contact with the properly-sized microcapsules.

In other words, the PET substrate, the first electrode, the first binder layers, the properly-sized microcapsules, the second binder layer, the second electrodes, and the PET substrate were laminated in this order.

In this regard, it is to be noted that the second binder layer preliminarily formed on the surface of the opposite substrate was provided on the entire surfaces of the second electrodes.

Further, the concave portions in which the second electrodes were provided were filled with the binder solution to obtain the second binder layer.

Example 3

An electrophoretic display device was manufactured in the same manner as the Example 1 except that a base substrate and an opposite substrate in which concave portions were not formed were used as the base substrate (which was formed from the first electrode and the PET substrate) and the opposite substrate (which was formed from the second electrodes and the PET substrate).

Example 4

An electrophoretic display device was manufactured in the same manner as the Example 2 except that a base substrate and an opposite substrate in which concave portions were not formed were used as the base substrate (which was formed from the first electrode and the PET substrate) and the opposite substrate (which was formed from the second electrodes and the PET substrate).

Comparative Example 1

An electrophoretic display device was manufactured in the same manner as the Example 1 except that the following steps were carried out instead of separately supplying the plurality of microcapsules and the binder solution to the first electrode. Microcapsules were dispersed in a binder solution obtained by dissolving a binder to a solvent to obtain a microcapsule dispersion liquid. Then, the microcapsules dispersion liquid was supplied onto the first electrode so as to simultaneously supply the microcapsules and the binder.

Comparative Example 2

An electrophoretic display device was manufactured in the same manner as the Example 2 except that the following steps were carried out instead of separately supplying the microcapsules and the binder solution to the first electrode. Microcapsules were dispersed in a binder solution obtained by dissolving a binder to a solvent to obtain a microcapsules dispersion liquid. Then, the microcapsules dispersion liquid was supplied onto the first electrode so as to simultaneously supply the microcapsules and the binder.

2. Evaluation 2.1 Measurement of Contrast Ratio in Display and Leak Current

In the electrophoretic display device manufactured in each of the Examples 1 to 4 and the Comparative Examples 1 and 2, images were displayed by using the electrophoretic display device. Thereafter, contrast ratio in display was obtained in the images and leak current was measured.

The images were subjected to a reflectance meter to obtain a colored reflectance and a white reflectance. The contrast ratio in the display was calculated as follows. The colored reflectance in a colored display area was defined as "Rc" and the white reflectance in a white display area was defined as "Rw". The constant ratio was calculated by using the relation "Rw/Rc".

The leak current was measured by using an ammeter based on the following measurement conditions to obtain a leak current value. The obtained leak current value was divided by an area in which the surface of the first electrode opposite to the surface of each second electrode. That is, the obtained leak current value was shown as a current density in Table 1.

Measurement Conditions of Leak Current

A voltage to be applied to between the first electrode and the second electrodes was set DC 15 V. A time to apply the voltage to between the first electrode and the second electrodes was set 400 milliseconds. When current became stable after the voltage was applied to between the first electrode and the second electrodes, the leak current (constant leak current) was measured.

2.2 Evaluation of Arrangement of Microcapsules and Bubbles Mixed to First Binder Layers and/or Second Binder Layer The electrophoretic display device manufactured in each of the Examples 1 to 4 and the Comparative Examples 1 and 2 was cut along a long direction thereof by using a dicing apparatus to obtain a cross-section surface of the electrophoretic display device. Then, the cross-section surface of the cut electrophoretic display device was observed as shown in FIG. 1.

First, the arrangement of the properly-sized microcapsules included in the electrophoretic display device was observed by using an optical microscope and an electron scanning microscope. As a result, the arrangement of the properly-sized microcapsules was evaluated by the following two criteria.

Next, bubbles which have been mixed to the first binder layers and/or the second binder layer included in the electrophoretic display device was observed by using the optical microscope and the electron scanning microscope. As a result, the bubbles were evaluated by the following four criteria.

Evaluation Criteria of Arrangement of Microcapsules

A: The properly-sized microcapsules were arranged in a substantially monolayer. That is to say, the properly-sized microcapsules were a side by side relation.

B: There were a large number of portions in which the microcapsules (properly-sized and improperly-sized) were overlapped with each other.

Evaluation Criteria of Bubbles Mixed to First Binder Layers and/or Second Binder Layer A: Bubbles were not virtually mixed to the first binder layers and/or the second binder layer.

B: Fine bubbles were slightly mixed to the first binder layers and/or the second binder layer.

C: Large bubbles were mixed to some positions of the first binder layers and/or the second binder layer.

D: A large number of bubbles were mixed to the entire first binder layers and/or the entire second binder layer. Hereinafter, evaluation results of the items 2.1 and 2.2 are shown in Table 1.

TABLE 1

| | Conditions of manufacturing electrophoretic display device | | | Evaluation results | | | |
|---|---|---|---|---|---|---|---|
| | | | | | Leak | Arrangement | |
| | Method of supplying microcapsules | Method of forming second binder layer | Concave portions | Display contrast | current [mA/cm$^2$] | of microcapsules | Bubbles |
| Ex. 1 | Microcapsules are separately supplied with constituent material of second binder layer | Second binder layer and second electrodes are separately formed | Yes | 4.5 | 0.54 | A | B |
| Ex. 2 | Microcapsules are separately supplied with constituent material of second binder layer | Second binder layer are preliminarily formed on second electrodes | Yes | 5.4 | 0.15 | A | A |
| Ex. 3 | Microcapsules are separately supplied with constituent material of second binder layer | Second binder layer and second electrodes are separately formed | No | 4.4 | 0.48 | A | B |
| Ex. 4 | Microcapsules are separately supplied with constituent material of second binder layer | Second binder layer are preliminarily formed on second electrodes | No | 5.1 | 0.18 | A | A |
| Comp. Ex. 1 | Microcapsules are simultaneously supplied with constituent material of second binder layer | — | Yes | 3.2 | 0.75 | B | D |
| Comp. Ex. 2 | Microcapsules are simultaneously supplied with constituent material of second binder layer | — | No | 2.8 | 0.81 | B | D |

*d: Volume-average particle size of microcapsules [μm]

As can be seen in Table 1, the electrophoretic display device manufactured in each of the Examples 1 to 4, that is, all of the electrophoretic display device of the present invention exhibited superior contrast ratio in display as compared to that of the electrophoretic display device manufactured in each of the Comparative Examples 1 and 2.

In the case where the concave portions were provided on the base substrate and the opposite substrate (Examples 1 and 2), the contrast ratio in the display was particularly high as compared to a case where the concave portions were not provided on the base substrate and the opposite substrate (Examples 3 and 4).

Further, the leak current per unit area generated in the electrophoretic display device manufactured in each of the Examples 1 to 4 was lower than that generated in the electrophoretic display device manufactured in each of the Comparative Examples 1 and 2.

Here, photographs of the cross-section surface of the electrophoretic display device manufactured in the Example 1 were taken by the optical microscope. The photographs were shown in FIGS. 9A and 9B. Likewise, photographs of the cross-section surface of the electrophoretic display device manufactured in the Comparative Example 1 were taken by the optical microscope. The photographs were shown in FIGS. 10A and 10B.

Figures 9A, 9B:
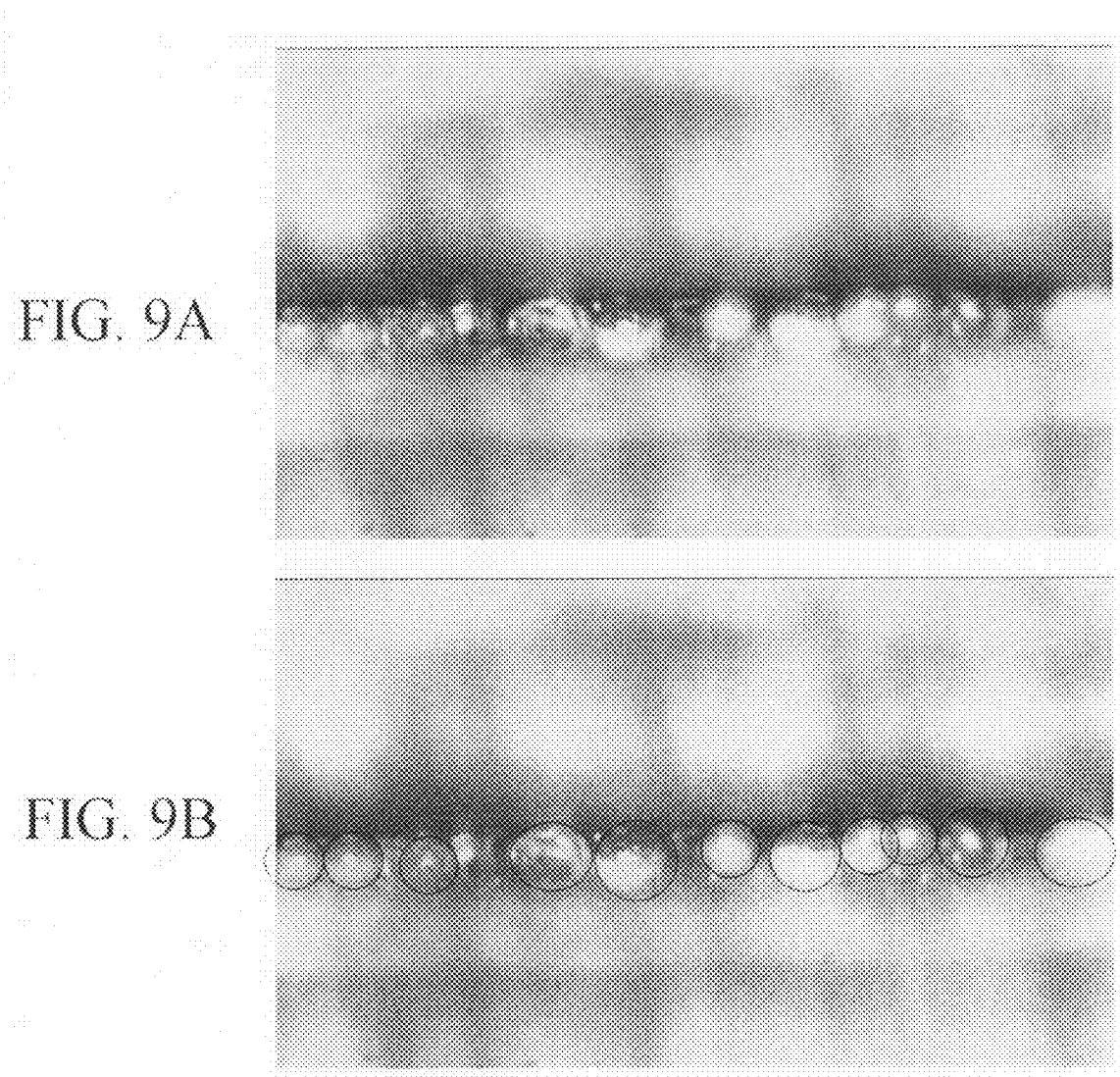
FIGS. 9A and 9B are photographs showing a vertical section of the electrophoretic display device manufactured in the Example 1.
Figure 10A:
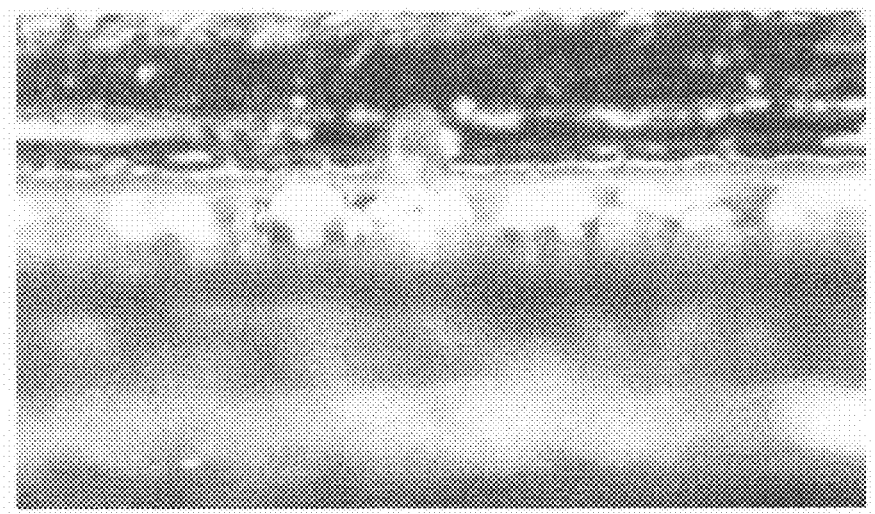
FIGS. 10A and 10B are photographs showing a vertical section of the electrophoretic display device manufactured in the Comparative Example 1.
Figure 10B:
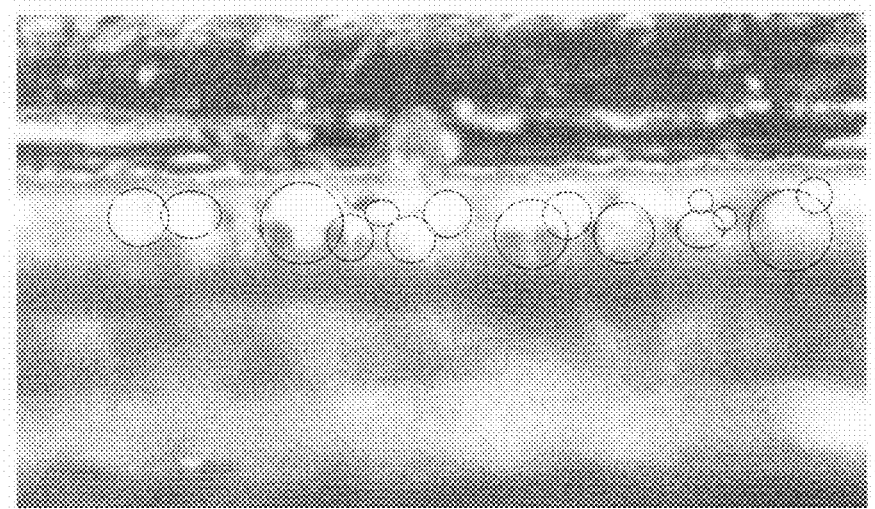

In each of the FIG. 9 and FIG. 10, the FIG. 9A and FIG. 10A are the photographs of the cross-section surface, and the FIG. 9B and FIG. 10B are photographs which emphatically show profiles of the microcapsules in the photographs of the FIG. 9A and FIG. 10A.

As can be seen in FIGS. 9A and 9B, in the electrophoretic display device manufactured in the Example 1, the properly-sized microcapsules were a side by side relation in the thickness direction of the base substrate (up-down direction in FIGS. 9A and 9B) so as to become a monolayer without overlapping with each other. In addition, the bubbles were not mixed in the first binder layers and/or the second binder layer.

On the other hand, as can be seen in FIGS. 10A and 19B, in the electrophoretic display device manufactured in the Comparative Example 1, the microcapsules (properly-sized and improperly-sized) were overlapped with each other in the thickness direction of the base substrate (up-down direction in FIGS. 10A and 10B). In addition, a large number of the bubbles were mixed in the first binder layers and/or the second binder layer.

What is claimed is:

1. A method of manufacturing an electrophoretic display device, the method comprising:
    preparing a plate-shaped first electrode provided on a first base portion, and the first electrode having a surface;
    forming a first binder layer on the surface of the first electrode;
    supplying a plurality of microcapsules on the first binder layer, the plurality of microcapsules each having an internal space, the internal space filled with an electrophoretic dispersion liquid, the electrophoretic dispersion liquid containing electrophoretic particles having different colors, and the plurality of microcapsules including properly-sized microcapsules and improperly-sized microcapsules;
    fixing the properly-sized microcapsules to the surface of the first electrode through the first binder layer to obtain an electrophoretic display sheet;
    removing the improperly-sized microcapsules which are not brought into contact with the first binder layer from the electrophoretic display sheet;
    forming a second binder layer on the first binder layer so as to cover the properly-sized microcapsules;
    providing second electrodes provided on a second base portion on the second binder layer to obtain the electrophoretic display device, wherein
        the first electrode has a plurality of concave portions on the surface thereof, and the first binder layer is selectively formed in the concave portions of the first electrode, and
        the first binder layer includes sub-first binder layers, the sub-first binder layers are formed only in the concave portions of the first electrode.

2. The method as claimed in claim 1, wherein when a volume-average particle size of the properly-sized microcapsules is defined as "d", the depth of each of the concave portions provided on the surface of the first electrode is in the range of 0.1d to 0.25d.

3. The method as claimed in claim 2, wherein an average thickness of the first binder layer is in the range of 10 to 60% with respect to the depth of each of the concave portions provided on the surface of the first electrode.

4. The method as claimed in claim 1, wherein the supplying step of the plurality of microcapsules comprising:
dispersing the plurality of microcapsules to a dispersion medium having a volatile property to obtain a microcapsule dispersion liquid;
supplying the microcapsule dispersion liquid onto the first binder layer to obtain a liquid coating film; and
volatilizing and removing the dispersion medium from the liquid coating film to thereby allow the properly-sized microcapsules to remain on the first binder layer.

5. The method as claimed in claim 4, wherein the specific gravity of the dispersion medium is lower than the specific gravity of each of the plurality of microcapsules.

6. The method as claimed in claim 1, wherein before the removing step of the improperly-sized microcapsules and after the fixing step of the properly-sized microcapsules, wherein the method further comprising: compressing the properly-sized microcapsules in a thickness direction of the first base portion to press the properly-sized microcapsules to the first binder layer.

7. The method as claimed in claim 6, wherein the pressure of compressing the properly-sized microcapsules is in the range of 0.01 to 0.2 MPa.

8. The method as claimed in claim 1, wherein the removing step of the improperly-sized microcapsules is carried out by tilting the electrophoretic display sheet to allow the improperly-sized microcapsules to fall from the electrophoretic display sheet.

9. The method as claimed in claim 1, wherein the removing step of the improperly-sized microcapsules is carried out by applying vibration to the electrophoretic sheet to shake the improperly-sized microcapsules from the electrophoretic display sheet.

10. The method as claimed in claim 1, wherein in the fixing step of the properly-sized microcapsules, the properly-sized microcapsules form interspaces therebetween, wherein the second binder layer is formed on the first binder layer so as to fill the interspaces.

11. The method as claimed in claim 1, wherein the second base portion has a surface on which the second electrodes are formed and a plurality of concave portions provided on the surfaces thereof, and the second electrodes formed on the surface of the second base portion and in the concave portions of the second base portion, wherein the second binder layer is formed on the first binder layer so as to be in contact with the second electrodes formed in the concave portions provided on the surface of the second base portion.

12. The method as claimed in claim 11, wherein when a volume-average particle size of the properly-sized microcapsules is defined as "d", the depth of each of the concave portions provided on the surface of the second base portion is in the range of 0.12d to 0.5d.

13. The method as claimed in claim 1, wherein a volume-average particle size of the properly-sized microcapsules is in the range of 20 to 60 p.m.

14. The method as claimed in claim 1, wherein each of the properly-sized microcapsules has in a substantially spherical shape.

15. A method of manufacturing an electrophoretic display device, the method comprising:
preparing a plate-shaped first electrode provided on a first base portion, and the first electrode having a surface;
preparing plate-shaped second electrodes provided on a second base portion;
forming a first binder layer on the surface of the first electrode;
supplying a plurality of microcapsules on the first binder layer, the plurality of microcapsules each having an internal space, the internal space filled with an electrophoretic dispersion liquid, the electrophoretic dispersion liquid containing electrophoretic particles having different colors, and the plurality of microcapsules including properly-sized microcapsules and improperly-sized microcapsules;
fixing the properly-sized microcapsules to the surface of the first electrode through the first binder layer to obtain an electrophoretic display sheet;
removing the improperly-sized microcapsules which are not brought into contact with the first binder layer from the electrophoretic display sheet;
forming a second binder layer preliminarily on the second electrodes provided on the second base portion;
providing the second binder layer formed on the second electrodes on the properly-sized microcapsules of the electrophoretic sheet so that the second binder layer adheres to the properly-sized microcapsules to obtain the electrophoretic display device, wherein
the first electrode has a plurality of concave portions on the surface thereof, and the first binder layer is selectively formed in the concave portions of the first electrode, and
the first binder layer includes sub-first binder layers, the sub-first binder layers are formed only in the concave portions of the first electrode.

* * * * *